United States Patent
Nakao et al.

(10) Patent No.: US 7,269,202 B2
(45) Date of Patent: Sep. 11, 2007

(54) RADIO APPARATUS, SWAP DETECTING METHOD AND SWAP DETECTING PROGRAM

(75) Inventors: Seigo Nakao, Gifu (JP); Nobuhiro Masaoka, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 836 days.

(21) Appl. No.: 10/221,164

(22) PCT Filed: Dec. 21, 2001

(86) PCT No.: PCT/JP01/11313

§ 371 (c)(1),
(2), (4) Date: Sep. 18, 2002

(87) PCT Pub. No.: WO02/054627

PCT Pub. Date: Jul. 11, 2002

(65) Prior Publication Data

US 2003/0040281 A1    Feb. 27, 2003

(30) Foreign Application Priority Data

Dec. 27, 2000   (JP) ............................. 2000-397465

(51) Int. Cl.
*H04B 1/00*     (2006.01)
*H03D 1/04*     (2006.01)
(52) U.S. Cl. .................. 375/147; 375/148; 375/346
(58) Field of Classification Search ............... 375/147, 375/148, 149, 150, 151, 153, 154, 316
See application file for complete search history.

(56) References Cited

U.S. PATENT DOCUMENTS

| | | | | |
|---|---|---|---|---|
| 6,061,553 A  * | 5/2000  | Matsuoka et al. | .......... | 455/273 |
| 6,204,813 B1 * | 3/2001  | Wadell et al.   | ..............| 342/463 |
| 6,240,098 B1 * | 5/2001  | Thibault et al. | ............ | 370/431 |
| 6,243,412 B1 * | 6/2001  | Fukawa          | ...................... | 375/219 |
| 6,275,543 B1 * | 8/2001  | Petrus et al.   | ................. | 375/324 |
| 6,330,294 B1 * | 12/2001 | Ansbro et al.   | .............. | 375/347 |
| 6,393,073 B1 * | 5/2002  | Eilts           | .......................... | 375/340 |
| 6,449,268 B1 * | 9/2002  | Doi             | ........................... | 370/349 |
| 6,466,557 B1 * | 10/2002 | Doi             | ........................... | 370/332 |

(Continued)

FOREIGN PATENT DOCUMENTS

CN    1223038 A    7/1999

(Continued)

OTHER PUBLICATIONS

Notice of Ground of Rejection dated Jan. 10, 2006 of corresponding Japanese Application No. 2002-554997.

*Primary Examiner*—Chieh M. Fan
*Assistant Examiner*—Jason M. Perilla
(74) *Attorney, Agent, or Firm*—Westerman, Hattori, Daniels & Adrian, LLP.

(57) ABSTRACT

In a user signal processing unit USP, adaptive array processing is performed for a reception signal vector X(t) from array antennas #1 to #4. Based on an output signal y(t) of an adaptive array and a reference signal, an amount of frequency offset $\Delta\theta$ is estimated. A swap detecting unit SDP detects an occurrence of swap, based on the estimated amount of offset $\Delta\theta$, frequency of error occurrence and the like.

27 Claims, 12 Drawing Sheets

U.S. PATENT DOCUMENTS

| | | | |
|---|---|---|---|
| 6,636,493 B1* | 10/2003 | Doi et al. | 370/332 |
| 6,647,078 B1* | 11/2003 | Thomas et al. | 375/349 |
| 6,690,747 B2* | 2/2004 | Petrus et al. | 375/324 |
| 6,771,985 B1* | 8/2004 | Iinuma | 455/561 |
| 6,834,043 B1* | 12/2004 | Vook et al. | 370/310 |
| 2001/0031022 A1* | 10/2001 | Petrus et al. | 375/324 |
| 2001/0049295 A1* | 12/2001 | Matsuoka et al. | 455/562 |
| 2002/0028689 A1* | 3/2002 | Iwami et al. | 455/502 |
| 2002/0044614 A1* | 4/2002 | Molnar et al. | 375/346 |
| 2002/0085653 A1* | 7/2002 | Matsuoka et al. | 375/347 |
| 2003/0139202 A1* | 7/2003 | Doi et al. | 455/562 |
| 2004/0053581 A1* | 3/2004 | Iwami et al. | 455/101 |
| 2004/0072560 A1* | 4/2004 | Mori et al. | 455/423 |
| 2004/0077319 A1* | 4/2004 | Koike et al. | 455/101 |
| 2004/0137906 A1* | 7/2004 | Nakao et al. | 455/450 |
| 2004/0246889 A1* | 12/2004 | Ogawa et al. | 370/210 |
| 2005/0181831 A1* | 8/2005 | Doi | 455/562.1 |
| 2006/0014497 A1* | 1/2006 | Doi et al. | 455/67.11 |

FOREIGN PATENT DOCUMENTS

| | | |
|---|---|---|
| JP | 2000-4177 | 1/2000 |
| JP | 2000004177 A | 1/2000 |
| JP | 2000-106696 | 4/2000 |
| WO | WO-00/26988 | 5/2000 |

* cited by examiner

RADIO APPARATUS, SWAP DETECTING METHOD AND SWAP DETECTING PROGRAM

TECHNICAL FIELD

The present invention relates to a configuration of radio equipment used for a base station, in radio communication such as communication using a portable telephone.

BACKGROUND ART

In recent years, in rapidly developing mobile communication system (for example, a Personal Handy Phone System, hereinafter referred to as PHS), a PDMA (Path Division Multiple Access) system has been proposed, in which an identical time slot of an identical frequency is spatially divided for an efficient use of radio wave frequencies, and mobile terminals of a plurality of users can establish path multiple access to a mobile base system. In the PDMA system, a signal from a mobile terminal of each user is separately extracted by well-known adaptive array processing. The PDMA system is also referred to as an SDMA (Spatial Division Multiple Access) system.

FIG. 8 illustrates arrangements of channels in various communication systems: a frequency division multiple access (FDMA) system, a time division multiple access (TDMA) system and a spatial division multiple access (SDMA) system.

With reference first to FIG. 8, the FDMA, TDMA and SDMA systems are briefly described. FIG. 8(a) illustrates the FDMA system, in which analog signals of users 1 to 4 are frequency-divided and transmitted with radio waves having different frequencies f1 to f4 so that the signals of each user 1 to 4 are separated by a frequency filter.

In the TDMA system shown in FIG. 8(b), digitized signals of each user are time-divided and transmitted with radio waves having different frequencies f1 to f4 at every certain time (time slot) so that the signals of each user are separated by a frequency filter as well as time synchronization between a base station and a mobile terminal of each user.

On the other hand, recently, portable telephone sets have been widely used, and the SDMA system is proposed to enhance efficient use of radio wave frequency. This SDMA system is employed for spatially dividing one time slot at the same frequency and transmitting data of a plurality of users, as shown in FIG. 8(c). In this SDMA system, signals of each user are separated, using a frequency filter, time synchronization between a base station and a mobile terminal of each user, and a mutual interference eliminator such as an adaptive array.

FIG. 9 is a schematic block diagram showing a configuration of a transmission/reception system 2000 of a conventional SDMA base station.

In the configuration shown in FIG. 9, four antennas #1 to #4 are provided for identifying users PS1 and PS2.

In a receiving operation, outputs from the antennas are supplied to an RF circuit 2101. In RF circuit 2101, outputs are amplified through a receiving amplifier, and frequency-converted with a local oscillation signal. Thereafter, unnecessary frequency signals are removed through a filter, A/D converted, and supplied to a digital signal processor 2102 as digital signals.

Digital signal processor 2102 is provided with a channel allocation reference calculator 2103, a channel allocator 2104 and an adaptive array 2100. Channel allocation reference calculator 2103 calculates in advance whether or not the adaptive array can separate signals received from two users. In response to the result of this calculation, channel allocator 2104 supplies channel allocation information including user information for selecting a frequency and time to adaptive array 2100. Adaptive array 2100 performs operation, in real time, of the signals from the four antennas #1 to #4 based on the channel allocation information, and assigns weights thereto. Thus, only a signal from a specific user is separated.

[Configuration of Adaptive Array Antenna]

FIG. 10 is a block diagram showing a configuration of a transmission/reception unit 2100a corresponding to one user among adaptive array 2100. In the example shown in FIG. 10, n input ports 2020-1 to 2020-n are provided for extracting a signal of a desired user from input signals including a plurality of user signals.

Signals input to each input port 2020-1 to 2020-n are supplied to a weight vector control unit 2011 and multipliers 2012-1 to 2012-n through switching circuits 2010-1 to 2010-n.

Weight vector control unit 2011 calculates weight vectors $w_{1i}$ to $w_{ni}$, using the input signals, a unique word signal stored in advance in a memory 2014 and corresponding to the signal from the specific user as well as an output of an adder 2013. Here, the subscript i indicates a weight vector used for transmission/reception to/from an ith user.

Multipliers 2012-1 to 2012-n multiply the input signals from each input port 2020-1 to 2020-n by weight vectors $w_{1i}$ to $w_{ni}$ respectively, and supply the results to adder 2013. Adder 2013 adds up the output signals from multipliers 2012-1 to 2012-n, and outputs the sum as a reception signal $S_{RX}(t)$, which is also supplied to weight vector control unit 2011.

Transmission/reception unit 2100a further includes multipliers 2015-1 to 2015-n, which receive an output signal $S_{TX}(t)$ from an adaptive array radio base station, multiply the same by weight vectors $w_{1i}$ to $w_{ni}$ supplied from weight vector control unit 2011 respectively, and output the results. The outputs of multipliers 2015-1 to 2015-n are supplied to switching circuits 2010-1 to 2010-n respectively. In other words, switching circuits 2010-1 to 2010-n, when receiving the signals, supply the signals received from input ports 2020-1 to 2020-n to a signal receiving unit 1R and, when transmitting the same, supply signals from a signal transmission unit 1T to input/output ports 2020-1 to 2020-n.

[Operation Principle of Adaptive Array]

The operation principle of transmission/reception unit 2100a shown in FIG. 10 is now briefly described.

In the following, for the sake of simplicity, it is assumed that the number of antenna elements is four and the number of users PS simultaneously in communication is two. In this case, signals supplied from each antenna to receiving unit 1R are expressed as follows:

$$RX_1(t) = h_{11} Srx_1(t) + h_{12} Srx_2(t) + n_1(t) \quad (1)$$

$$RX_2(t) = h_{21} Srx_1(t) + h_{22} Srx_2(t) + n_2(t) \quad (2)$$

$$RX_3(t) = h_{31} Srx_1(t) + h_{32} Srx_2(t) + n_3(t) \quad (3)$$

$$RX_4(t) = h_{41} Srx_1(t) + h_{42} Srx_2(t) + n_4(t) \quad (4)$$

where signal $RX_j(t)$ represents a reception signal of a jth (j=1, 2, 3, 4) antenna, and signal $Srx_i(t)$ represents a signal transmitted from an ith (i=1, 2) user.

Further, coefficient $h_{ji}$ represents a complex coefficient of a signal from the ith user, received at the jth antenna, and $n_j(t)$ represents noise included in a jth reception signal.

The above equations (1) to (4) are expressed in a vector form as follows:

$$X(t)=H_1 Srx_1(t)+H_2 Srx_2(t)+N(t) \quad (5)$$

$$X(t)=[RX_1(t), RX_2(t) \ldots, RX_n(t)]^T \quad (6)$$

$$H_i=[h_{1i}, h_{2i}, \ldots, h_{ni}]^T, (i=1, 2) \quad (7)$$

$$N(t)=[n_1(t), n_2(t), \ldots, n_n(t)]^T \quad (8)$$

Note that $[\ldots]^T$ represents transposition of $[\ldots]$ in equations (6) to (8).

In the equations, X(t) represents an input signal vector, $H_1$ represents a reception signal coefficient vector of the ith user, and N(t) represents a noise vector respectively.

As shown in FIG. 10, an adaptive array antenna outputs, as a reception signal SRX(t), the signal synthesized by multiplying the input signals from respective antennas by weight coefficients $w_{1i}$ to $w_{ni}$. Note that the number n of antennas is set to four.

In order to extract a signal $Srx_1(t)$ transmitted from a first user, for example, after the aforementioned preparation, the adaptive array operates in the following manner.

An output signal y1(t) from adaptive array 2100 can be expressed as follows, by multiplying the input signal vector X(t) by a weight vector $W_1$.

$$y1(t)=X(t)W_1^T \quad (9)$$

$$W_1=[w_{11}, w_{21}, w_{31}, w_{41}]^T \quad (10)$$

Here, weight vector $W_1$ has a weight coefficient $w_{ji}$ (j=1, 2, 3, 4) multiplied by jth input signal $RX_j(t)$ as an element.

Here, input signal vector X(t) expressed in the equation (5) is substituted in y1(t) expressed in the equation (9).

$$y1(t)=H_1 W_1^T Srx_1(t)+H_2 W_1^T Srx_2(t)+N(t)W_1^T \quad (11)$$

When adaptive array 2100 ideally operates, weight vector control unit 2011 sequentially controls weight vector $W_1$ by a well-known method so as to satisfy the following simultaneous equations.

$$H_1 W_1^T=1 \quad (12)$$

$$H_2 W_1^T=0 \quad (13)$$

When weight vector $W_1$ is completely controlled to satisfy the equations (12) and (13), output signal y1(t) from adaptive array 2100 is finally expressed as follows.

$$y1(t)=Srx_1(t)+N_1(t) \quad (14)$$

$$N_1(t)=n_1(t)w_{11}+n_2(t)w_{21}+n_3(t)w_{31}+n_4(t)w_{41} \quad (15)$$

In other words, for output signal y1(t), signal $Srx_1(t)$ transmitted from the first user out of two can be obtained.

Referring to FIG. 10, input signal $S_{TX}(t)$ for adaptive array 2100 is supplied to transmission unit 1T in adaptive array 2100, and to one input of multipliers 2015-1, 2015-2, 2015-3, . . . , 2015-n. Weight vectors $w_{1i}, w_{2i}, w_{3i}, \ldots, w_{ni}$ calculated by weight vector control unit 2011 based on the reception signals as described above are copied and applied to the other inputs of these multipliers respectively.

The input signals weighted by these multipliers are sent and transmitted to corresponding antennas #1, #2, #3, . . . , #n through corresponding switches 2010-1, 2010-2, 2010-3, . . . , 2010-n.

Here, the users PS1 and PS2 are identified in the following manner. A radio signal from a portable telephone set is transmitted with a frame structure. The radio signal from the portable telephone set roughly includes a preamble consisting of a signal series already-known to the radio base station as well as data (voice etc.) consisting of a signal series unknown to the same.

The signal series of the preamble includes a signal string of information for identifying whether or not one particular user is a desired user for the radio base station to establish communication with. Weight vector control unit 2011 of adaptive array radio base station 1 compares the unique word signal corresponding to user A fetched from memory 2014 with the received signal series, and performs weight vector control (decision of a weight coefficient) so as to extract a signal seeming to include a signal series corresponding to user PS1.

During an operation for establishing communication, information for identifying a terminal that requested a connection to the base station is communicated between the base station and the terminal.

For example in the PHS system, however, once the communication is established, generally, information for identifying a particular user is not contained in the unique word signal (UW signal) described above. Therefore, in principle, the base station cannot identify the terminal being in communication. This will apply not only to the PDMA system as described above but also to the conventional PHS system of TDMA, for example.

In the PHS system of the conventional TDMA system, it is known that, between adjacent base stations, users talking on the phone may be interchanged, or communication with a terminal connected with a particular base station may be interrupted by a radio wave from other terminal. Such poor communication is called "SWAP".

FIG. 11 is a conceptual illustration showing one mode of swap in the PHS system of such conventional TDMA system.

FIG. 11 shows an interchange of signals communicated between a terminal PS1 of a user 1 in communication with a base station CS1 and a terminal PS2 of a user 2 in communication with an adjacent base station CS2.

FIG. 12 is a conceptual illustration showing another mode of swap in the PHS system of such conventional TDMA system.

In FIG. 12, communication of terminal PS1 of user 1 in communication with base station CS1 with a signal PS1 has been interrupted by a signal PS2 from terminal PS2 of user 2 in communication with adjacent base station CS2.

If swap as described above occurs, a signal corresponding to other terminal will be heard as a noise at the terminal of the user originally in communication, because signals PS1 and PS2 are scrambled differently.

Moreover, in a mobile communication system in accordance with the PDMA system as described above, a reception timing (also referred to as a synchronous position) when a signal transmitted from each mobile terminal arrives at a radio base station will vary by various factors such as change of a distance from a terminal to a base station due to the travel of the terminal, and variation in a property of radio wave propagating path. When mobile terminals of a plurality of users establish path multiple access to an identical time slot in the mobile communication system in accordance with the PDMA system, reception timings of reception signals from respective mobile terminals may vary and come closer to each other, because of the above-described reasons. Possibly, temporal relation may be inverted.

If the reception timings are too close to each other, a correlation value between the reception signals from the plurality of mobile terminals will be high, resulting in lower accuracy in signal extraction per user by adaptive array processing. This will also lead to deterioration of communication property for each user. Here, in the PHS system, as described above, the reception signal from each mobile terminal includes a reference signal (a unique word signal) section consisting of an already-known bit string common to all users for each frame. Therefore, if the reception timings of the reception signals from the mobile terminals of the plurality of users should coincide, the reference signal sections of the reception signals will overlap, and each user cannot be identified separately, thus causing an interference between users (SWAP as described above).

In addition, in the mobile communication system in accordance with the PDMA system, if the number of users establishing multiple access to each time slot increases, that is, degree of path multiplicity rises, a transmission timing interval in each slot will inevitably be narrowed. As a result, the reception timings may come closer to each other or cross. In such a case, as described above, it is more likely that communication property may be lowered, or interference between users may be caused.

FIG. 13 is a conceptual illustration showing one mode of swap in the PHS system in accordance with the PDMA system.

In FIG. 13, signals communicated between terminal PS1 of user 1 in communication with base station CS1 through one path and terminal PS2 of user 2 in communication with the same through another path have been interchanged.

FIG. 14 is a conceptual illustration showing another mode of swap in the PHS system in accordance with the PDMA system.

In FIG. 14, communication of terminal PS1 of user 1 in communication with base station CS1 with signal PS1 through one path has been interrupted by signal PS2 from terminal PS2 of user 2 in communication with the same through another path.

In this case as well, interference will considerably lower communication quality, as in the conventional PHS system.

DISCLOSURE OF THE INVENTION

A primary object of the present invention is to provide radio equipment capable of preventing swap between mobile communication terminals communicating with a base station as well as maintaining good communication quality.

Another object of the present invention is to provide a method of detecting swap, for preventing swap between mobile communication terminals communicating with the base station as well as maintaining good communication quality Yet another object of the present invention is to provide a computer program in the radio equipment capable of preventing swap between mobile communication terminals communicating with the base station as well as maintaining good communication quality.

In summary, the present invention provides radio equipment including a receiving unit for separating a reception signal from a plurality of terminals. The receiving unit includes an offset estimating unit for extracting a frequency offset of the reception signal at a prescribed timing, and a swap detecting unit detecting an occurrence of swap of signals from the plurality of terminals, based on an estimation result of the offset estimating unit.

Preferably, the receiving unit of the radio equipment further includes an array antenna having a plurality of antennas, and an adaptive array processing unit receiving signals from the plurality of antennas and extracting a signal from a prescribed terminal.

Preferably, the adaptive array processing unit includes a weight vector calculating unit calculating a weight vector to multiply a signal from the array antenna respectively. The reception signal includes a plurality of frames, and each frame has a reference signal for calculating a weight vector and an error detecting code. The swap detecting unit detects swap, based on a calculation error of the weight vector by the reference signal for a reception signal from one of the plurality of terminals, and an error detection result for a reception signal from another terminal among the plurality of terminals.

Preferably, the adaptive array processing unit includes a weight vector calculating unit calculating a weight vector to multiply a signal from the array antenna respectively. The reception signal includes a plurality of frames, and each frame has a reference signal for calculating a weight vector. The swap detecting unit detects swap, based on a calculation error of the weight vector by the reference signal for a reception signal from one of the plurality of terminals, and a convergence property of weight vector calculation for a reception signal from another terminal among the plurality of terminals.

Preferably, the adaptive array processing unit includes a weight vector calculating unit calculating a weight vector to multiply a signal from the array antenna respectively. The swap detecting unit detects swap, based on a temporal change in an incoming direction of a reception signal from one of the plurality of terminals.

Preferably, the reception signal includes a plurality of frames, and the radio equipment and the plurality of terminals communicate information on a frame number of the reception signal at a prescribed interval. The swap detecting unit detects swap, based on a temporal change in the frame number from one of the plurality of terminals.

According to another aspect of the present invention, radio equipment receiving a reception signal having a plurality of frames includes a receiving unit for separating the reception signal from a plurality of terminals. The receiving unit includes an array antenna having a plurality of antennas, and an adaptive array processing unit receiving a signal from the plurality of antennas and extracting a signal from a prescribed terminal. The adaptive array processing unit has a weight vector calculating unit calculating a weight vector to multiply a signal from the array antenna respectively, based on a reference signal included in each frame. The radio equipment further includes a swap detecting unit detecting an occurrence of swap of signals from the plurality of terminals, based on a calculation error of the weight vector by the reference signal for a reception signal from one of the plurality of terminals, and an error detection result of a reception signal from another terminal among the plurality of terminals based on an error detecting code included in each frame for error detection.

According to yet another aspect of the present invention, radio equipment receiving a reception signal including a plurality of frames includes a receiving unit for separating the reception signal from a plurality of terminals. The receiving unit includes an array antenna having a plurality of antennas, and an adaptive array processing unit receiving a signal from the plurality of antennas and extracting a signal from a prescribed terminal. The adaptive array processing unit has a weight vector calculating unit calculating a weight vector to multiply a signal from the array antenna respectively, based on a reference signal included in each frame. The radio equipment further includes a swap detecting unit detecting swap, based on a calculation error of the weight vector by the reference signal for a reception signal from one of the plurality of terminals and a convergence property of weight vector calculation for a reception signal from another terminal among the plurality of terminals.

According to yet another aspect of the present invention, radio equipment receiving a reception signal including a plurality of frames, each frame having a reference signal for calculating a weight vector, includes a receiving unit for separating the reception signal from a plurality of terminals. The receiving unit includes an array antenna having a plurality of antennas, and an adaptive array processing unit receiving a signal from the plurality of antennas and extracting a signal from a prescribed terminal. The adaptive array processing unit has a weight vector calculating unit calculating a weight vector to multiply a signal from the array antenna respectively, based on a reference signal included in each frame. The radio equipment further includes a swap detecting unit detecting swap, based on a temporal change in an incoming direction of a reception signal from one of the plurality of terminals.

According to yet another aspect of the present invention, radio equipment receiving a reception signal including a plurality of frames includes a receiving unit for separating the reception signal from a plurality of terminals, and a swap detecting unit detecting swap, in response to a temporal change in a frame number from one of the plurality of terminals, detected based on information on the frame number included in the reception signal at least at a prescribed interval.

According to yet another aspect of the present invention, a method of detecting swap in radio equipment capable of separately receiving a reception signal from a plurality of terminals, includes the steps of extracting a frequency offset of the reception signal at a prescribed timing, and detecting an occurrence of swap of signals from the plurality of terminals, based on an estimation result of the frequency offset.

According to yet another aspect of the present invention, the method of detecting swap in radio equipment capable of separately receiving, for each terminal, a reception signal transmitted from a plurality of terminals by using an array antenna including a plurality of antennas is provided. The reception signal includes a plurality of frames, and each frame has a reference signal for calculating a weight vector and an error detecting code. The method includes the steps of receiving a signal from the plurality of antennas, performing adaptive array processing by calculating the weight vector to multiply a signal from the array antenna respectively based on the reference signal, and extracting a signal from a prescribed terminal; detecting a calculation error of the weight vector by the reference signal for a reception signal from one of the plurality of terminals; detecting an error for a reception signal from another terminal among the plurality of terminals; and detecting swap based on the calculation error and a result of the error detection.

According to yet another aspect, the present invention provides the method of detecting swap in radio equipment capable of separately receiving, for each terminal, a reception signal transmitted from a plurality of terminals by using an array antenna including a plurality of antennas. The reception signal includes a plurality of frames, and each frame has a reference signal for calculating a weight vector. The method includes the steps of receiving a signal from the plurality of antennas, performing adaptive array processing by calculating the weight vector to multiply a signal from the array antenna respectively based on the reference signal, and extracting a signal from a prescribed terminal; detecting a calculation error of the weight vector by the reference signal for a reception signal from one of the plurality of terminals; and detecting swap based on a convergence property of weight vector calculation for a reception signal from another terminal among the plurality of terminals and the calculation error.

According to yet another aspect of the present invention, the method of detecting swap in radio equipment capable of separately receiving, for each terminal, a reception signal transmitted from a plurality of terminals by using an array antenna including a plurality of antennas is provided. The reception signal includes a plurality of frames, and each frame has a reference signal for calculating a weight vector. The method includes the steps of receiving a signal from the plurality of antennas, performing adaptive array processing by calculating the weight vector to multiply a signal from the array antenna respectively based on the reference signal, and extracting a signal from a prescribed terminal; and detecting swap based on a temporal change in an incoming direction of a reception signal from one of the plurality of terminals.

According to yet another aspect of the present invention, the method of detecting swap in radio equipment receiving a reception signal including a plurality of frames includes the steps of separating the reception signal from a plurality of terminals; communicating information on a frame number of the reception signal at a prescribed interval between the radio equipment and the plurality of terminals; and detecting swap based on a temporal change in the frame number from one of the plurality of terminals.

According to yet another aspect of the present invention, a program for computer detecting swap in radio equipment capable of separately receiving a reception signal from a plurality of terminals executes the steps of extracting a frequency offset of the reception signal at a prescribed timing, and detecting an occurrence of swap of signals from the plurality of terminals, based on an estimation result of the frequency offset.

According to yet another aspect of the present invention, a program for computer detecting swap in radio equipment capable of separately receiving, for each terminal, a reception signal transmitted from a plurality of terminals by using an array antenna having a plurality of antennas is provided. The reception signal includes a plurality of frames, and each frame has a reference signal for calculating a weight vector and an error detecting code. The program executes the steps of receiving a signal from the plurality of antennas, performing adaptive array processing by calculating a weight vector to multiply a signal from the array antenna respectively based on the reference signal, and extracting a signal from a prescribed terminal; detecting a calculation error of the weight vector by the reference signal for a reception signal from one of the plurality of terminals; detecting an error for a reception signal from another terminal among the plurality of terminals; and detecting swap based on the calculation error and a result of the error detection.

According to yet another aspect of the present invention, a program for computer detecting swap in radio equipment capable of separately receiving, for each terminal, a reception signal transmitted from a plurality of terminals by using an array antenna having a plurality of antennas is provided. The reception signal includes a plurality of frames, and each frame has a reference signal for calculating a weight vector. The program executes the steps of receiving a signal from the plurality of antennas, performing adaptive array processing by calculating the weight vector to multiply a signal from the array antenna respectively based on the reference signal, and extracting a signal from a prescribed terminal; detecting a calculation error of the weight vector by the reference signal for a reception signal from one of the plurality of terminals; and detecting swap based on a convergence property of weight vector calculation for a reception signal from another terminal among the plurality of terminals and the calculation error.

According to yet another aspect of the present invention, a program for computer detecting swap in radio equipment capable of separately receiving, for each terminal, a reception signal transmitted from a plurality of terminals by using an array antenna having a plurality of antennas is provided. The reception signal includes a plurality of frames, and each frame has a reference signal for calculating a weight vector. The program executes the steps of receiving a signal from the plurality of antennas, performing adaptive array processing by calculating the weight vector to multiply a signal from the array antenna respectively based on the reference signal, and extracting a signal from a prescribed terminal; and detecting swap based on a temporal change in an incoming direction of a reception signal from one of the plurality of terminals.

According to yet another aspect of the present invention, a program for executing swap detection in radio equipment receiving a reception signal including a plurality of frames, executes the steps of separating the reception signal from a plurality of terminals; communicating information on a frame number of the reception signal at a prescribed interval between the radio equipment and the plurality of terminals; and detecting swap based on a temporal change in the frame number from one of the plurality of terminals.

Thus, a principal advantage of the present invention is to be able to detect an occurrence of swap in a base station, and to suppress an occurrence of an uncomfortable noise at a terminal caused by swap.

BEST MODES FOR CARRYING OUT THE INVENTION

First Embodiment

Figure 1:
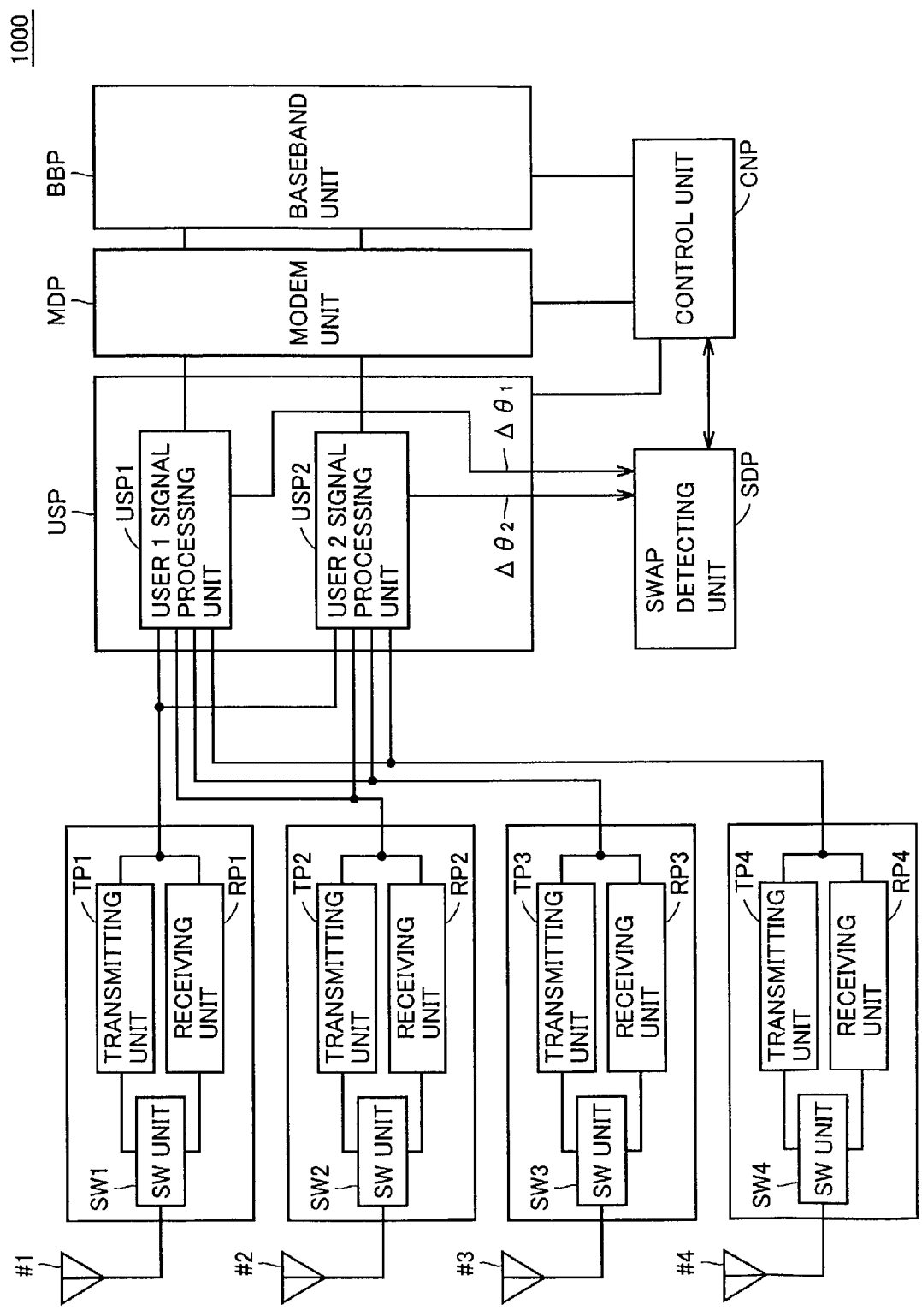
FIG. 1 is a schematic block diagram showing a configuration of an SDMA base station 1000 in a first embodiment.

FIG. 1 is a schematic block diagram showing a configuration of a SDMA base station 1000 in a first embodiment of the present invention.

In the following description, though SDMA base station 1000 is discussed in accordance with the configuration of the present application, some methods for detecting an occurrence of swap are more widely applicable, not limited to an SDMA system, as set forth below.

Referring to FIG. 1, SDMA base station 1000 includes transmission/reception units TRP1 to TRP4 providing a transmission signal to or receiving a reception signal from an array antenna having a plurality of antennas #1 to #4; a signal processing unit USP1 receiving a signal from transmission/reception units TRP1 to TRP 4 and processing a signal corresponding to user 1, for example; a signal processing unit USP2 receiving a signal from transmission/reception units TRP1 to TRP 4 and processing a signal corresponding to user 1; an SWAP detecting unit SDP detecting an occurrence of swap based on signals from signal processing units USP1 and USP2; a modem unit MDP performing orthogonal detection for signals from signal processing units USP1 and USP2; a baseband unit BBP for generating a digital signal for communication, for each slot, with signal processing units USP1 and USP2 through modem unit MDP; and a control unit CNP controlling an operation of SDMA base station 1000.

Transmission/reception unit TRP1 includes a transmission unit TP1 for processing a high frequency signal in transmission; a receiving unit RP1 for processing a high frequency signal in reception; and a switch SW unit SW1 switching a connection of antenna #1 with transmission unit TP1 and receiving unit RP1, dependent on whether operation is in either transmission mode or reception mode. Other transmission/reception units TRP2 to TRP4 also have the same configuration.

In the above description, though it is assumed that the number of antennas is four and the number of users is two, more generally, the number of antennas may be N (N: natural number), and multiple users are possible up to the number corresponding to the degree of freedom permitted in accordance with the number of the antennas.

Figure 2:
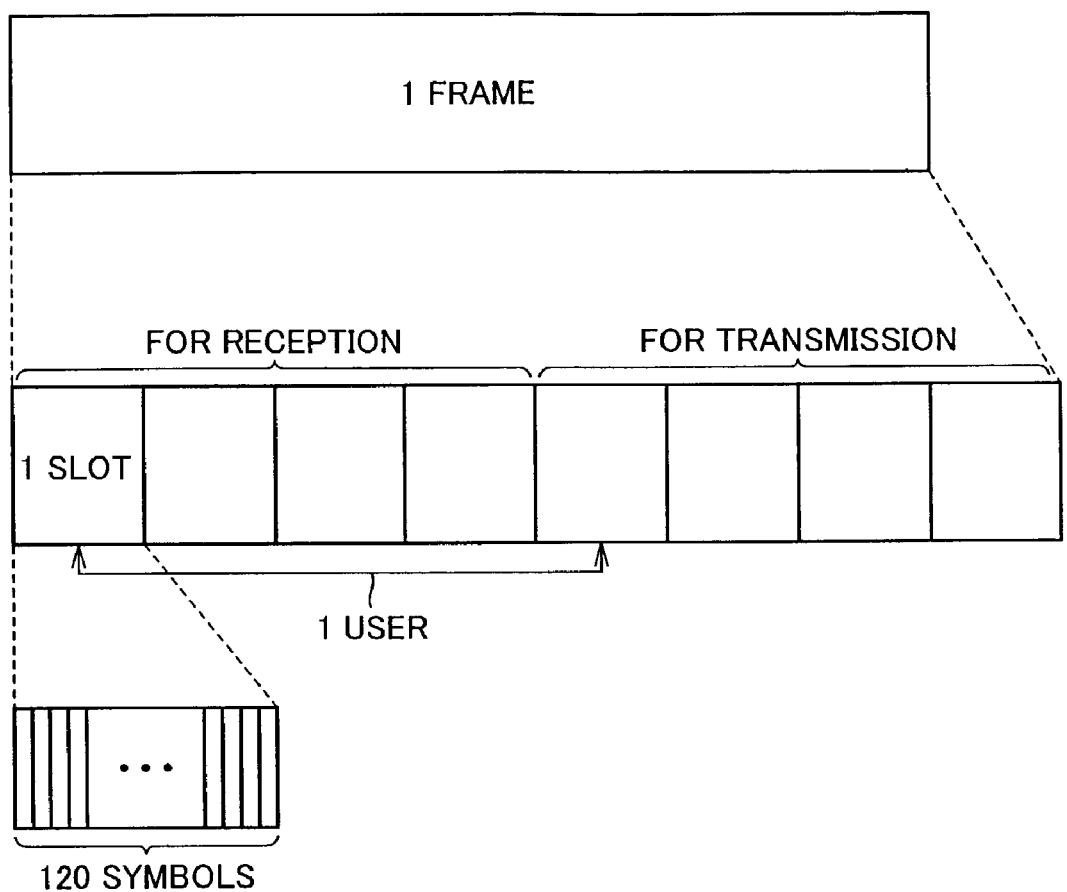
FIG. 2 is a conceptual illustration showing a configuration of a signal communicated between a terminal and SDMA base station 1000.

FIG. 2 is a conceptual illustration showing a configuration of a signal communicated between a terminal and SDMA base station 1000 in the present invention.

A signal of one frame is divided into 8 slots. Four slots in the first half is used for reception, for example, while four slots in the latter half is used for transmission, for example.

Each slot has 120 symbols. In the example shown in FIG. 2, one slot for reception and one slot for transmission compose one set, and a signal of one frame is allocated to four users.

Each frame includes a unique word signal (a reference signal) section as described above, and has a configuration in which error detection using a cyclic code (CRC: cyclic redundancy check) is possible.

In addition, when mobile terminals of a plurality of users establish path multiple access to an identical time slot, in order to identify each user by shifting reception timings of reception signals from respective mobile terminals, it is assumed that transmission timings for each terminal from base station 1000 are shifted from a reference transmission timing.

[Configuration for Detecting Frequency Offset]

For a modulation scheme employed in transmission/reception in a portable phone and the like, QPSK modulation, which is a modulation scheme based on PSK modulation, is generally employed.

In PSK modulation, synchronous detection is commonly performed, in which detection is conducted by multiplying a reception signal by a signal in synchronization with a carrier.

In the synchronous detection, a local oscillator generates a complex conjugate carrier in synchronization with the center frequency of a modulated wave. When synchronous detection is performed, however, a frequency error called "frequency offset" is usually present in oscillators on transmission and reception ends. Because of the error, when the reception signal is represented on an IQ plane, a position of a reception signal point is rotated on a receiver side. Therefore, unless the frequency offset is compensated, it is difficult to perform synchronous detection.

Such frequency offset is produced dependent on accuracy of local oscillation frequency during transmission and reception as described above, and in addition, produced by an error in setting, temperature fluctuation, change over time and the like. Reception property will abruptly deteriorate because a carrier frequency component remains in a signal input to a receiver.

It is necessary to detect and compensate for such a carrier frequency offset. In the present invention, an occurrence of swap is detected using a value for detected frequency offset, as described below.

Figure 3:
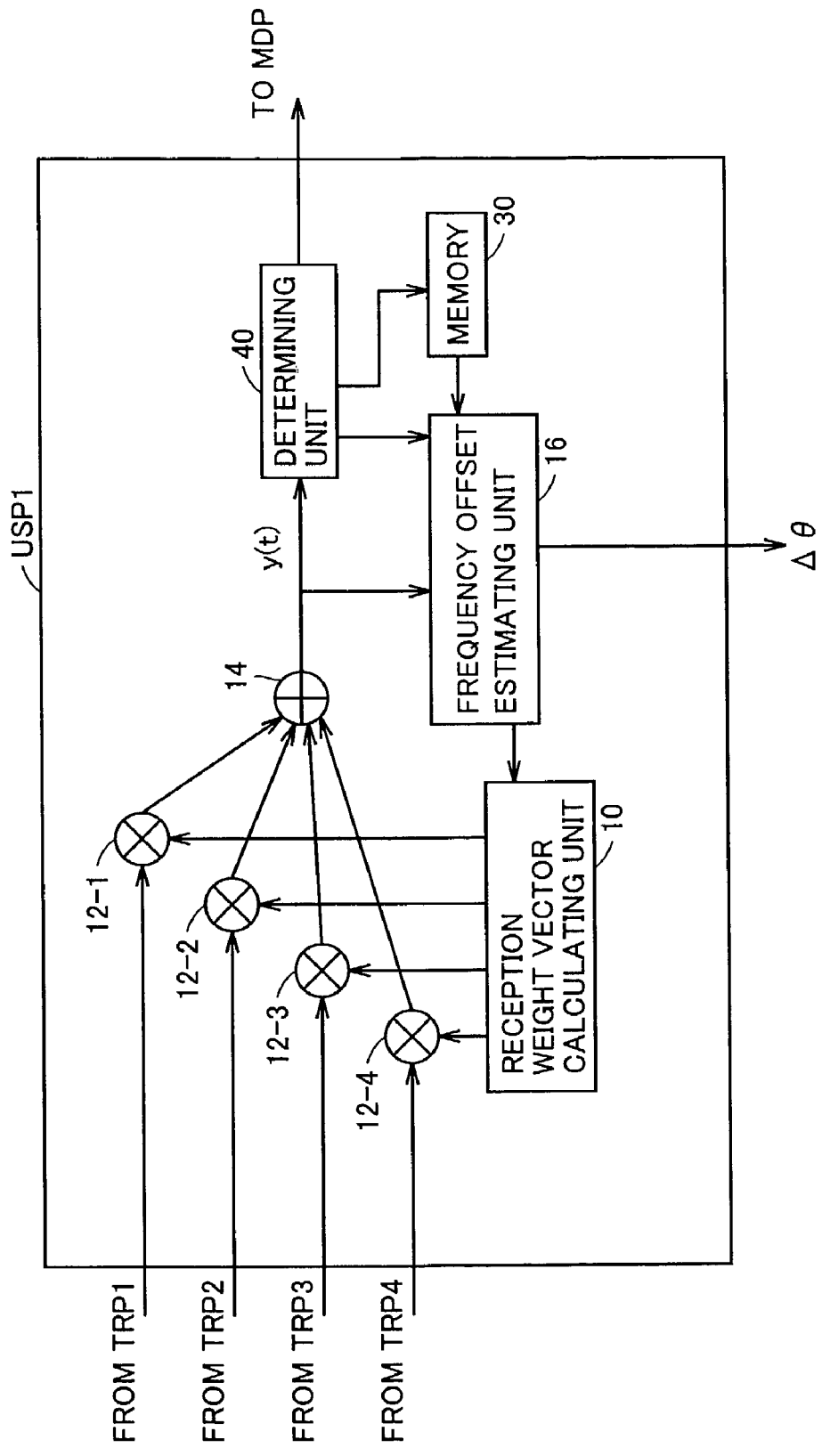
FIG. 3 is a schematic block diagram showing a configuration of a user 1 signal processing unit USP1.

FIG. 3 is a schematic block diagram showing a configuration of user 1 signal processing unit USP1 shown in FIG. 1. User 2 signal processing unit USP2 also has the same structure.

Referring to FIG. 3, provided are: multipliers 12-1 to 12-4 respectively receiving an element of reception signal vector X(t) having a signal from antennas #1 to #4 converted to a digital signal in transmission/reception units TRP1 to TRP4 and each multiplying an element of a weight vector W(t) by the former element; an adder 14 receiving and adding an output from multipliers 12-1 to 12-4 and providing the output as a reception signal y(t); a determining unit 40 receiving an output from adder 14 and detecting whether a reception signal is receiving a section having a reference signal or a section not having a reference signal (data portion), in a signal of one slot; a memory 30 holding in advance a reference signal included in a preamble among symbols (120 symbols, for example) contained in the signal of one slot, and outputting the signal as a signal d(t); a frequency offset estimating unit 16 receiving an output from memory 30 and signal y(t), controlled by determining unit 40, and detecting frequency offset $\Delta\theta$; and a weight calculating unit 10 receiving an output from frequency offset estimating unit 16 and calculating weight vector W(t) by well-known adaptive array processing.

Here, reception signal vector X(t) is given as a vector having a signal from respective one out of four antennas as an element.

Figure 4:
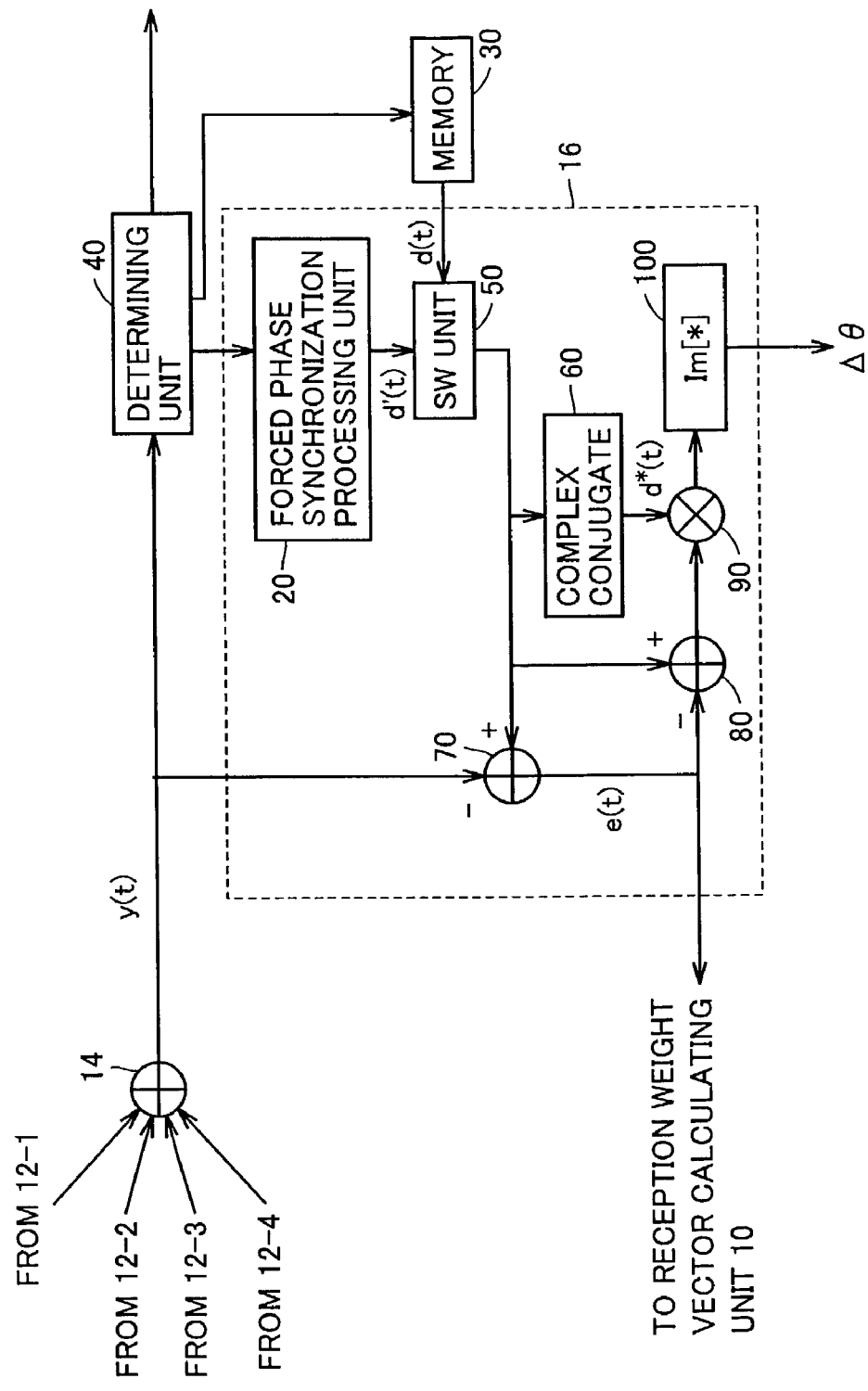
FIG. 4 is a schematic block diagram showing a configuration of a frequency offset estimating unit 16.

FIG. 4 is a schematic block diagram showing a configuration of frequency offset estimating unit 16 shown in FIG. 3.

Referring to FIG. 4, frequency offset estimating unit 16 includes a forced phase synchronization processing unit 20 receiving an output y(t) of adder 14 through determining unit 40 and forcibly synchronizing a phase of signal y(t) with a prescribed phase point on the IQ plane.

Here, for example, assume that signal y(t) is extracted from a desired terminal among a plurality of terminals, and is subjected to QPSK modulation, for example. Accordingly, forced phase synchronization processing unit 20 will perform a processing in which the QPSK modulated signal is forcibly synchronized with a signal point corresponding to a prescribed phase on the IQ plane.

In the following, a signal output from forced phase synchronization processing unit 20 is referred to as a replica signal d'(t).

Frequency offset estimating unit 16 further includes a switching circuit 50 receiving replica signal d'(t) from the forced phase synchronization processing unit and reference signal d(t) from memory 30, controlled by determining unit 40, and outputting either one of the above; and an adder 70 adding an output from switching circuit 50 and an output from adder 14, of which sign is reversed. Weight calculating unit 10 receives an output from adder 70 and calculates weight vector W(t) by well-known adaptive array processing.

Frequency offset estimating unit 16 further includes an adder 80 adding a signal in which the sign of an error signal e(t) output from adder 70 is reversed to reference signal d(t) output from switching circuit 50 or replica signal d'(t); a complex conjugate processing unit 60 receiving an output from switching circuit 50 and outputting a complex conjugate signal d*(t); a multiplier 90 multiplying an output from complex conjugate processing unit 60 by an output from adder 80; and an offset extracting unit 100 receiving an output from multiplier 90, extracting an imaginary number portion thereof, and extracting frequency offset $\Delta\theta$.

With the configuration as described above, a frequency offset can be estimated from a signal received by an array antenna. Note that estimation itself of the frequency offset is also applicable, for example, to the TDMA system, not limited to the SDMA system, so long as a signal y(t) from a particular terminal is detected.

[Configuration of Detecting Swap Occurrence]

Detecting Swap Occurrence Using Frequency Offset Value

Since the frequency offset value has a value characteristic to a transmitter of each terminal, an estimated value of the frequency offset will not usually be varied to a large extent in a short period of time. If swap occurs between user terminals, however, the estimated value of the frequency offset may be interchanged or abruptly change. Therefore, SWAP detecting unit SDP can detect an occurrence of swap by monitoring the frequency offset value. Thus, not only in the SDMA system but also in the conventional TDMA system and the like, monitoring the frequency offset estimated value can serve as a method of detecting swap occurrence.

Detecting Swap Using Error Distribution

As shown in FIG. 2, when mobile terminals of a plurality of users establish path multiple access to an identical time slot, in order to identify each user, reception timings of reception signals from respective mobile terminals are shifted, for example, by a time $\Delta t$ during normal reception.

Figure 5:
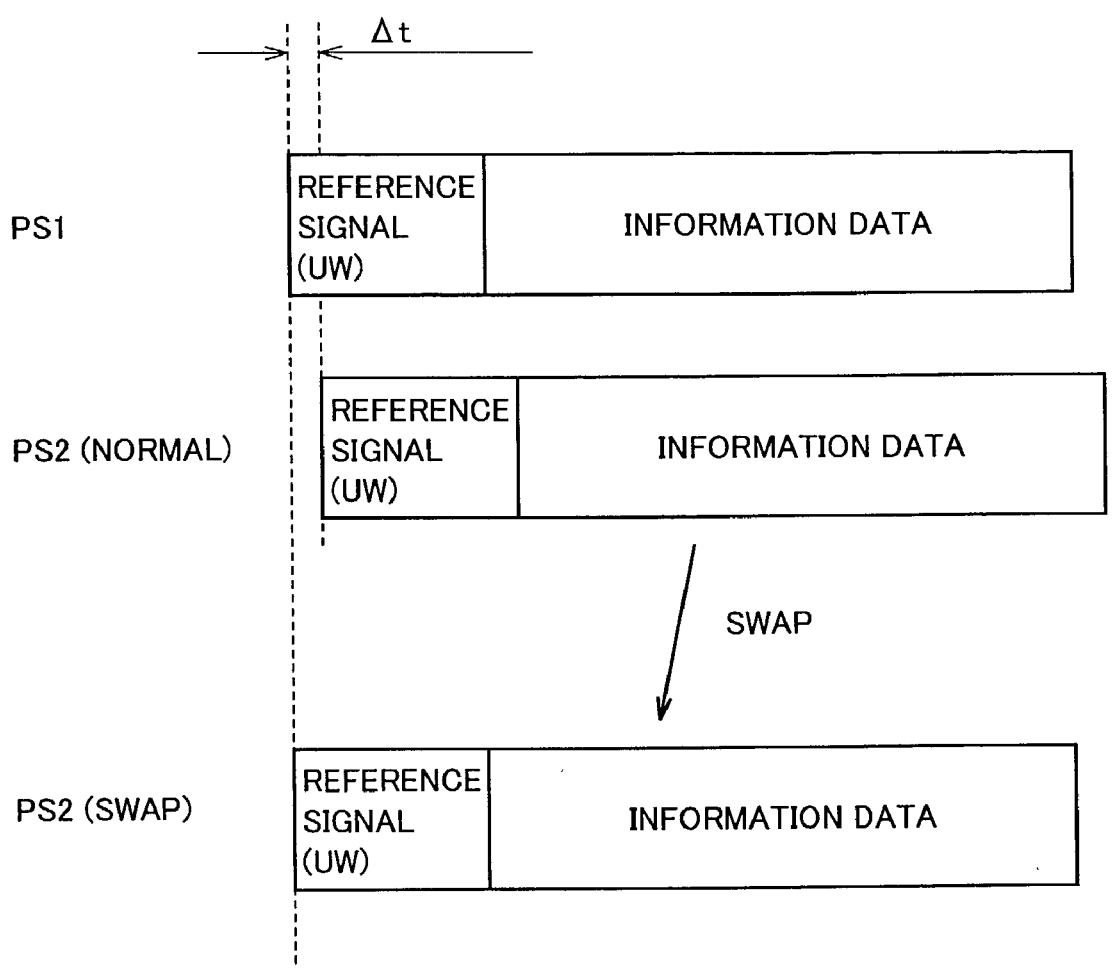
FIG. 5 is a conceptual illustration showing a reception timing of signals PS1 and PS2.

FIG. 5 is a conceptual illustration showing a reception timing of such signals PS1 and PS2.

As shown in FIG. 5, however, if swap due to user interruption occurs, terminal PS2 misidentifies a signal directed to terminal PS1 as a signal to itself. Consequently, terminal PS2 sends an up signal at a timing for terminal PS1 to transmit. This will eliminate a timing shift in the reception signals from terminals PS1 and PS2.

In a state where such swap has occurred, it seems to base station 1000 as if user PS2 who interrupted has disappeared. Therefore, a reference signal error (a UW error) is produced for user PS2.

On the other hand, for user PS1 who was interrupted, UW error is not produced because the unique word signal coincides between signals PS1 and PS2. For information data (voice signal, for example), however, a reception error (a CRC error) will frequently occur in the signal of user PS1 because signals PS1 and PS2 are different from each other.

Therefore, when two users are in communication by means of spatial multiple access, if a UW error occurs at one user while a CRC error occurs at the other, it can be determined as swap occurrence.

In such a situation as described above, for example, it is possible that a UW error occurs with a 100% frequency at user PS2, and a CRC error occurs with a 50% frequency at user PS1. This cannot take place so long as transmission/reception is in normal condition.

Detecting Swap Using Increase of MSE

In addition, in a reception weight vector calculating unit 10, weight vector W(t) is calculated by adaptive array processing, as described above. In the adaptive array processing, a processing for updating a weight is performed, so as to make smaller the square of an error between the sum of complex multiplication of a reception signal and a calculated weight and an already-known reference signal (a unique word signal).

In adaptive array processing, weight updating (weight learning) as described above is adaptively performed in accordance with time and variation in the property of a propagating path of a signal wave. An interfering component and noise are eliminated from the reception signal, and the reception signal from a desired mobile terminal is extracted.

In the weight calculator, weight updating, that is, weight learning is performed with Minimum Mean Square Error (hereinafter, referred to as "MMSE") based on the square of the error, as described above. More particularly, the weight calculator uses weight updating algorithms such as RLS (Recursive Least Squares) algorithm or LMS (Least Mean Squares) algorithm based on MMSE.

An adaptive array processing technique based on MMSE as well as RLS algorithm and LMS algorithm based on the same are well-known, and are described in detail, for example, in "Adaptive Signal Processing by Array Antenna" by Nobuyoshi Kikuma (Science Press, Inc.,) chapter 3, MMSE Adaptive Array, pp 35 to 49. Therefore, discussion thereof will not be provided.

As described above, in a state where swap has occurred, it seems to base station 1000 that user PS2 who interrupted has disappeared. Therefore, a reference signal error (a UW error) is produced at user PS2. On the other hand, at user PS1 who was interrupted, for information data (voice signal, for example), a reception error (a CRC error) will frequently occur in the signal of user PS1 because signals PS1 and PS2 are different from each other.

This will result in deterioration of a convergence property in adaptive array processing, and in abrupt increase in an MSE value. Therefore, when two users are in communication by means of spatial multiple access, if a UW error occurs at one user while the MSE value has abruptly increased at the other, it can be determined as swap occurrence. Here, "increase in an MSE value" means that, for example, the MSE value becomes 5 to 10 times larger between adjacent frames.

Detecting Swap Using Abrupt Change in Reception Response Vector

A reception response vector $H_1$ is estimated in the above described adaptive array processing. Based on the reception response vector $H_1$, an incoming direction of a reception signal at each receiving time point from each terminal can also be estimated.

Accordingly, unless a position of the terminal abruptly changes, the reception response vector or the incoming direction of the signal will not vary significantly. In other words, if the reception response vector or the incoming direction of the signal significantly varies in normal communication, it is more likely that communication with a wrong terminal has started, and it can be estimated that swap has occurred due to user interruption and user interchange.

For example, if the incoming direction is displaced by as much as approximately 30° between adjacent frames, it can be determined that swap has occurred.

Detecting Swap Using Abrupt Change in Frame Number

In the PHS system, information other than voice is periodically (every 10 seconds, for example) communicated between a terminal and a base station even during communication. Among the information, a sequence number, that is, a multiplication value of a frame number during communication is included. Thus, at the base station, for example, if the multiplication value of the frame number with user 1 suddenly and discontinuously changes during the periodic communication, it can be determined that swap has occurred.

Monitoring the frame number can serve as a method of detecting swap occurrence due to user interchange, not only in the SDMA system but also in the conventional TDMA system and the like.

Operation of Base Station 1000

Figure 6:
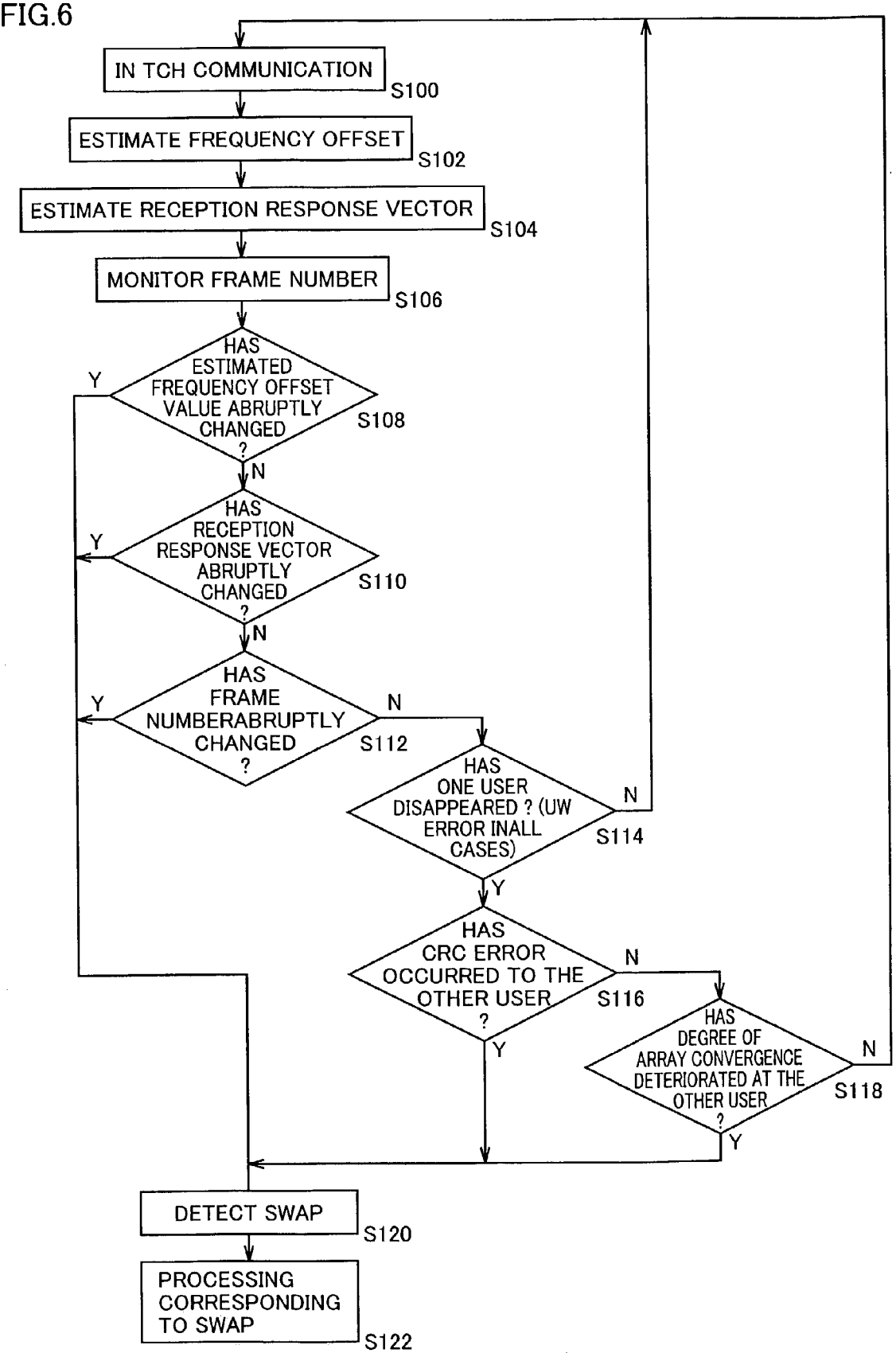
FIG. 6 is a flowchart showing an operation of SDMA base station 1000.

FIG. 6 is a flowchart showing an operation of SDMA base station 1000 shown in FIG. 1.

A function of swap detecting unit SDP in SDMA base station 1000 can be realized by a computer including a processor operating in accordance with software. When the processor determines that swap has occurred during a processing of normal communication control using one, or a combination, of the swap detection methods as described above, processing for dealing with swap occurrence is further performed by control unit CNP. The function of control unit CNP can also be realized by a computer including a processor operating in accordance with software.

First, processing performed in FIG. 6 will briefly be described. As already discussed, adaptive array processing is performed for signal X(t) from array antennas #1 to #4. Error e(t) between output signal y(t) output from an adaptive array and reference signal d(t) is found. Based on the error e(t), weight calculating unit 10 performs adaptive array learning. Then, weight vector W(t) is calculated, having a reception weight corresponding respectively to each antenna as an element.

Here, from output signal y(t) of the adaptive array and reference d(t) thereof, an error in a circumferential direction of a carrier frequency component on the IQ plane, that is, a frequency offset value Δθ(t) is extracted. In a reception signal slot, in a section having the reference signal, when weight vector W(t) is updated, a processing of updating the frequency offset completes a processing of estimating offset value Δθ(t) from reference signal d(t) and reception signal vector X(t) through adaptive array learning.

In a section not having the reference signal (data portion), based on an error between replica d'(t) in which adaptive array output y(t) is forcibly phase-synchronized with a reference signal point and an adaptive array output, weight vector W(t) and frequency offset value Δθ(t) are estimated through adaptive learning.

As described above, in SDMA base station 1000, array learning is performed for all symbols contained in one slot. For example, when applied to the PHS system, a processing of updating an offset compensation value is performed for already-known signal sections, that is, from first up to twelfth symbols, using reference signal d(t) in memory 30. In contrast, for a section not having the reference signal, that is, thirteenth symbol or later, a signal having array output y(t) forcibly phase-synchronized with a reference signal point of π/4 QPSK is employed as replica d'(t) of the reference signal for the processing of updating the offset compensation value.

Note that, in the following description, "t" is a variable representing time. For example, "t" as in offset compensation value θ(t) represents an elapsed time since a reference time point, that is, an amount corresponding to the number of symbols, for example.

Referring to FIG. 6, in each frame after a normal communication is established (step S100), a frequency offset is estimated (step S102).

Thereafter, a reception response vector (an incoming direction) is estimated (step S104), and processing of monitoring a frame number is performed at a prescribed period (step S106).

Whether a frequency offset value has abruptly changed or not is then determined (step S108). If abrupt change thereof between adjacent frames has been determined, the processing will proceed to step S120.

Meanwhile, in step S108, if the frequency offset value has not abruptly changed, whether the incoming direction has abruptly changed or not is successively determined based on the reception response vector (step S110). If abrupt change thereof between adjacent frames has been determined, the processing will proceed to step S120.

Meanwhile, in step S110, if the incoming direction has not abruptly changed, whether the frame number has abruptly changed or not is successively determined (step S112). If abrupt change in the incoming direction between adjacent frames has been determined, the processing will proceed to step S120.

Meanwhile, in step S112, if the incoming direction has not abruptly changed, whether one user seems to have disappeared or not is successively determined by monitoring a UW error (step S114). If it is not the case, the processing will return to step S100.

Meanwhile, in step S114, if the user seems to have disappeared, whether a CRC error has abruptly increased or not for a signal from the other user is determined (step S116).

If the CRC error has abruptly increased, the processing will proceed to step S120. Meanwhile, if the CRC error has not abruptly increased, whether convergence of an array of the reception signal for the other user has deteriorated or not is determined (step S118).

If convergence of the array is deteriorated, the processing will proceed to step S120. Meanwhile, if convergence of the array is not deteriorated, processing will return to step S100.

In step S120, SWAP detecting unit SDP provides notification of swap detection, considering that any of the conditions for swap detection has been satisfied.

SDMA base station 1000 performs processing corresponding to swap when it is detected.

Here, "processing corresponding to swap" refers to the following. Control unit CNP gives an instruction to all terminals in communication with base station 1000 to complete handover to other base stations, in response to a detection result of SWAP detecting unit SDP. In this way, since all terminals start communication via other base stations, noise caused by swap in each terminal will stop.

Alternatively, "processing corresponding to swap" can include intentionally rewriting a CRC bit in a signal the base station transmits, and causing an error in the signal. In this case, a reception error is constantly caused at the terminal. Therefore, a reception frame is muted, and voice will not be output. Consequently, corresponding to such an error, the terminal transmits a request for handover to other base stations, or a request for switching communication channels. Thus, the user will not hear a noise caused by swap.

With the above described configuration, swap is detected, and uncomfortable noise produced by swap can be suppressed in a terminal.

VARIATION OF FIRST EMBODIMENT

In a method of detecting swap described in FIG. 6, an occurrence of swap is eventually detected, possibly by fully going through the steps of "detecting an occurrence of swap using a frequency offset value", "detecting an occurrence of swap using abrupt change in a reception response vector", "detecting swap using abrupt change in a frame number", "detecting swap using error distribution" and "detecting swap using an increase of MSE."

Swap may be detected using any one or more of these methods. For example, a combination of two methods is possible.

In the following, an example using a combination of two methods, that is, "detecting an occurrence of swap using a frequency offset value" and "detecting swap using error distribution," will be described.

Figure 7:
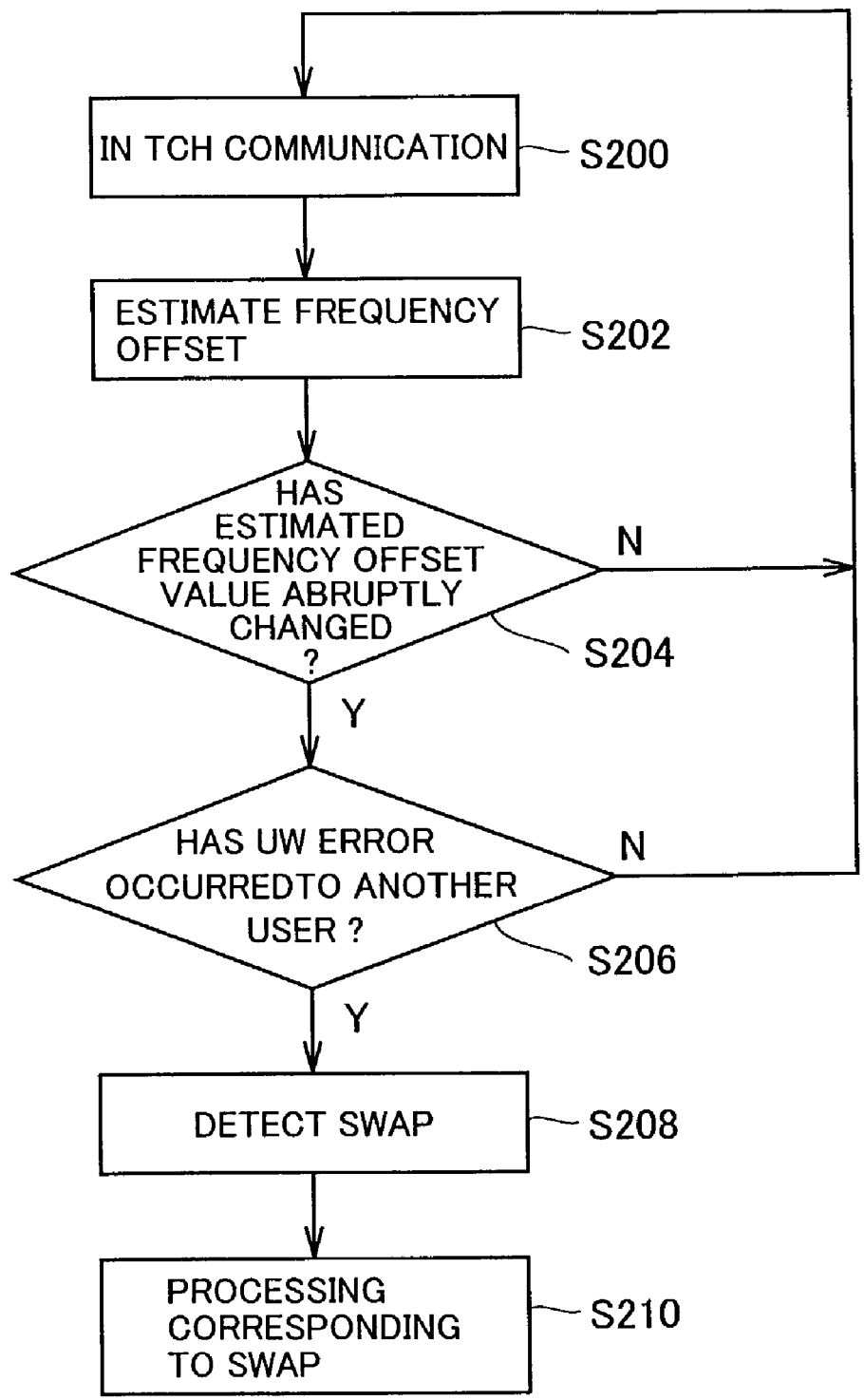
FIG. 7 shows a flow of another processing of swap detection.
Figure 8:
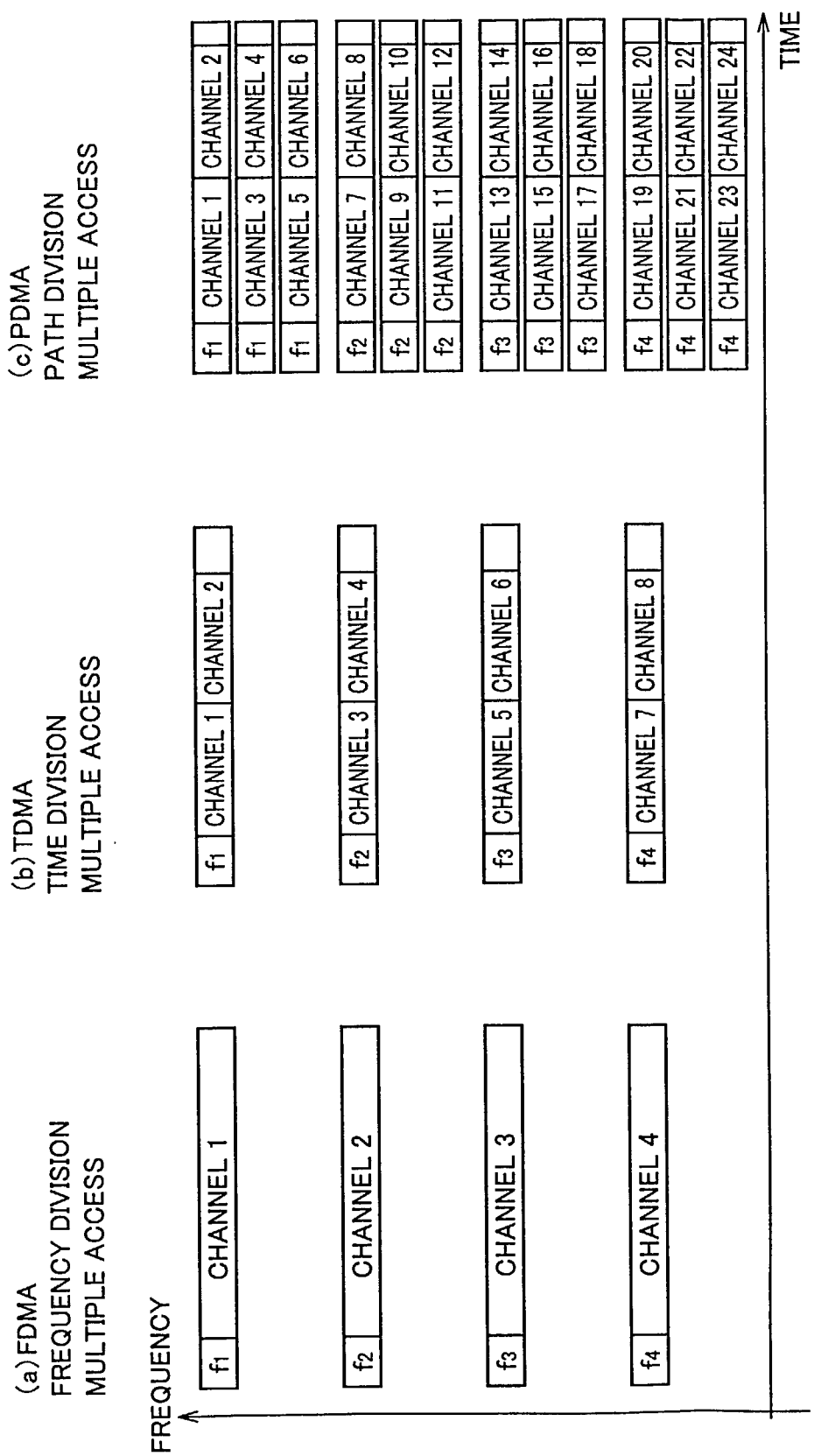
FIG. 8 shows a channel arrangement in a various communication systems including Frequency Division Multiple Access, Time Division Multiple Access and Spatial Division Multiple Access.
Figure 9:
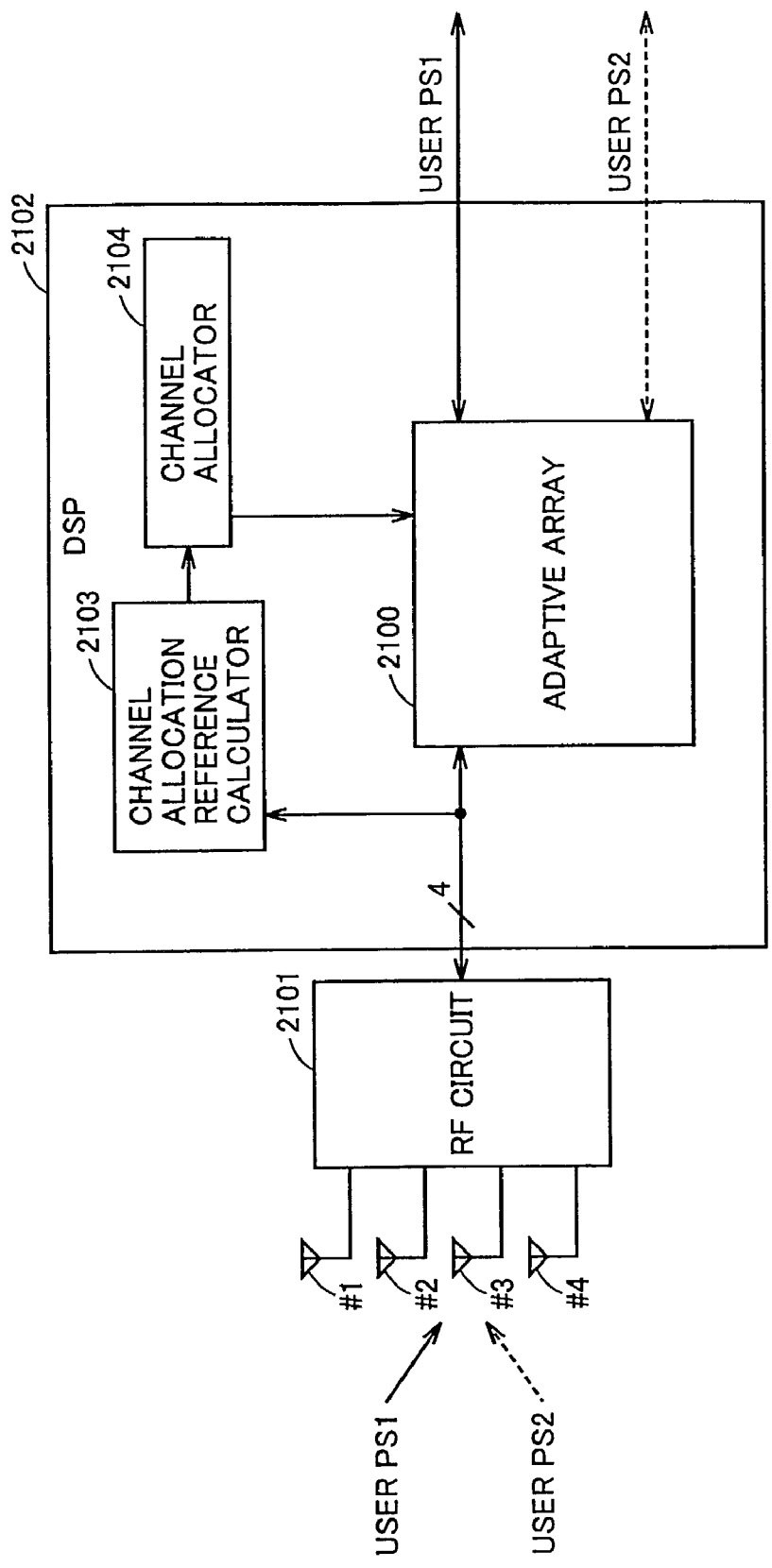
FIG. 9 is a schematic block diagram showing a configuration of a transmission/reception system 2000 of the SDMA base station.
Figure 10:
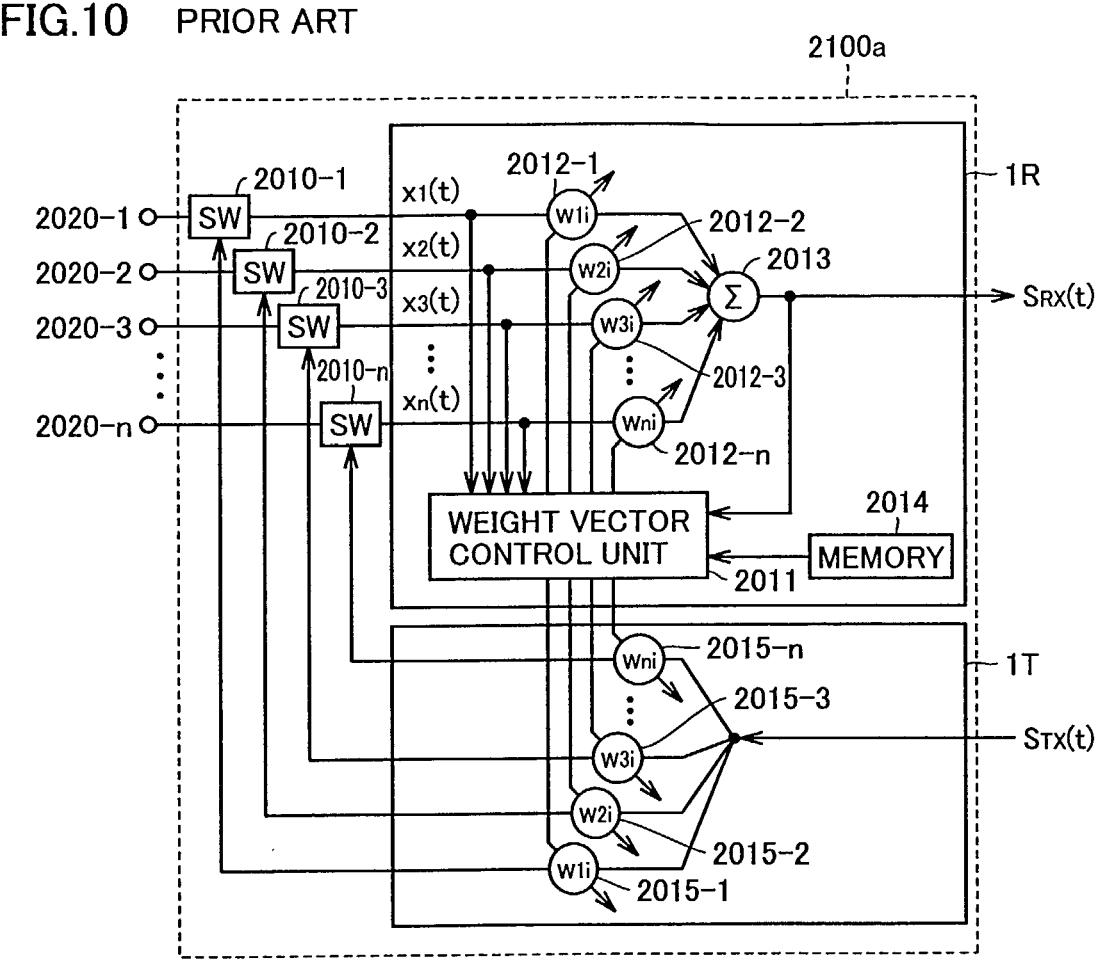
FIG. 10 is a block diagram showing a configuration of a transmission/reception unit 2100a corresponding to one user, among adaptive array 2100.
Figure 11:
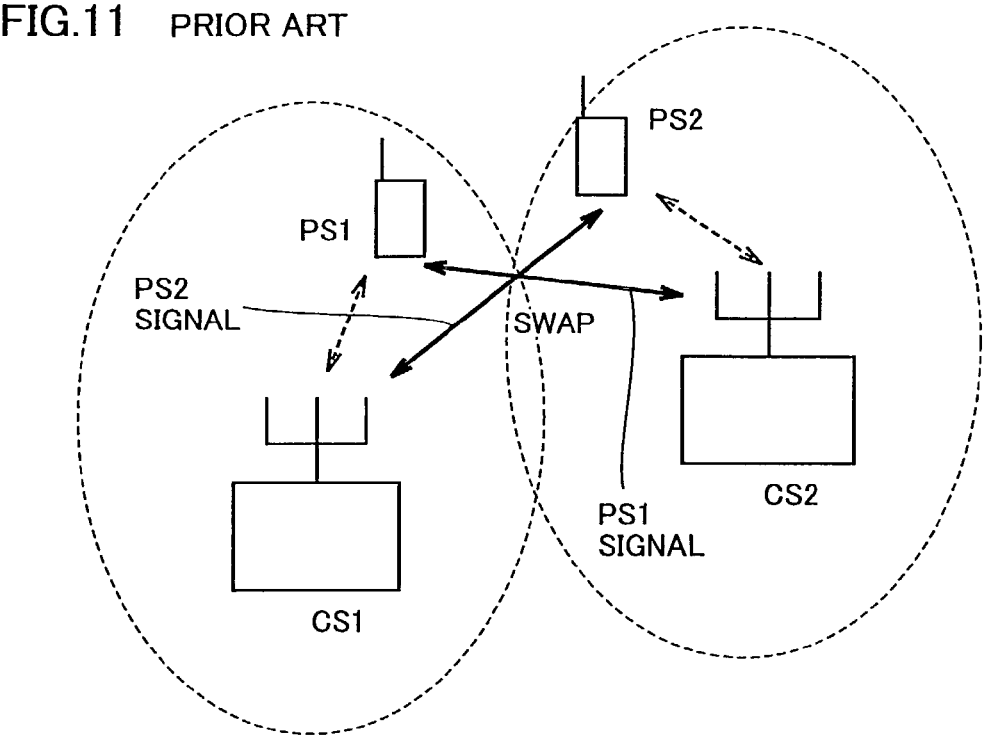
FIG. 11 is a conceptual illustration showing one mode of swap in a PHS system in accordance with a conventional TDMA system.
Figure 12:
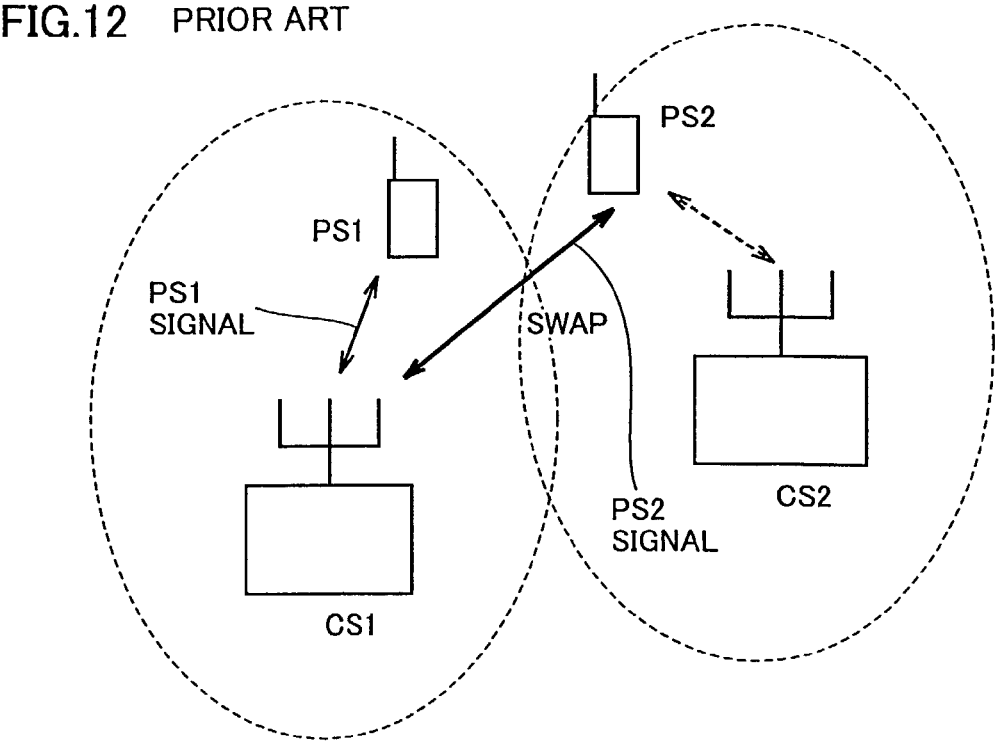
FIG. 12 is a conceptual illustration showing another mode of swap in the PHS system in accordance with the conventional TDMA system.
Figure 13:
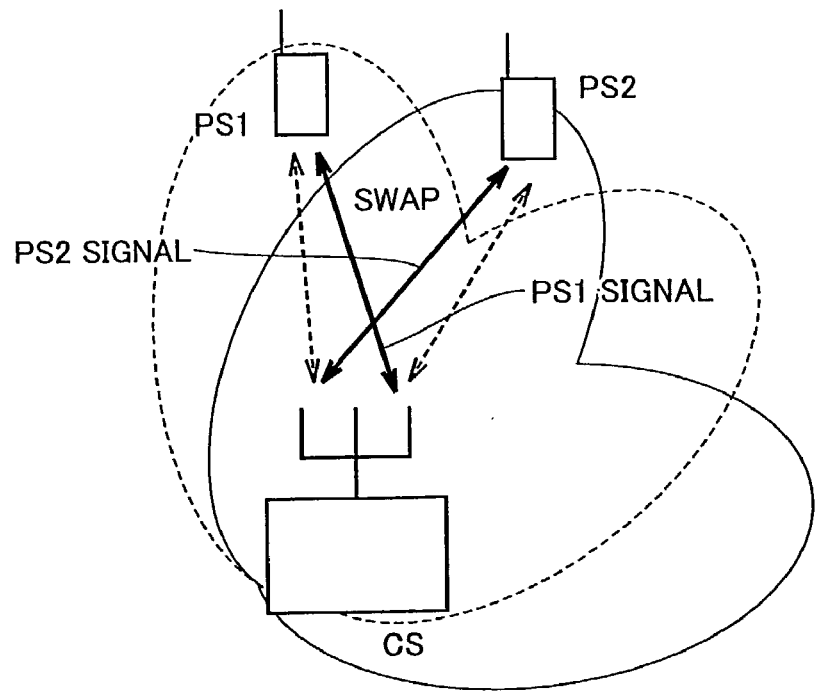
FIG. 13 is a conceptual illustration showing one mode of swap in a PHS system in accordance with a PDMA system.
Figure 14:
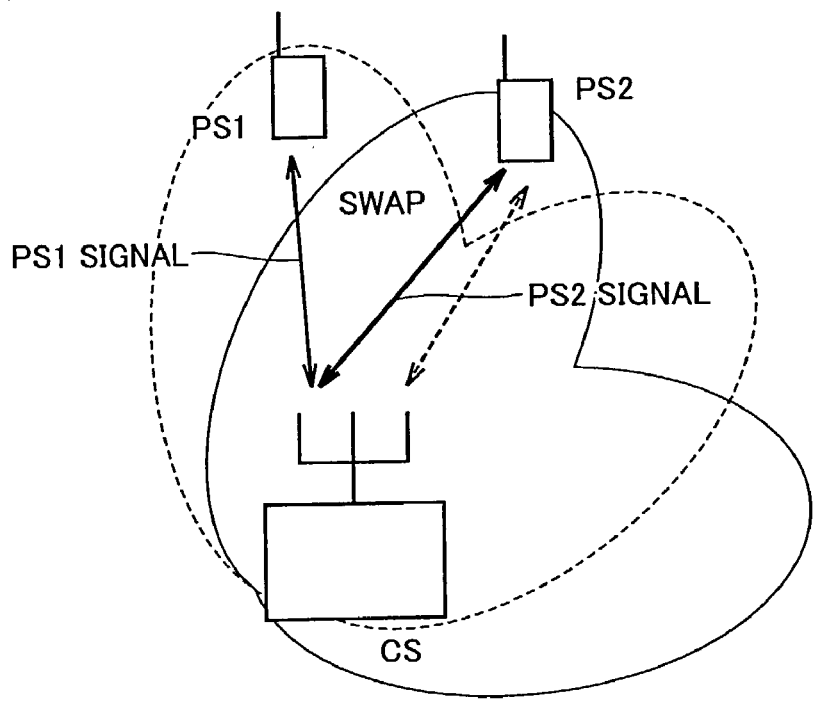
FIG. 14 is a conceptual illustration showing another mode of swap in the PHS system in accordance with the PDMA system.

FIG. 7 shows a process flow when detecting swap in such a manner. A processor performing processing as SWAP detecting unit SDP operates in accordance with software for realizing a function as described below, and detects swap occurrence.

Referring to FIG. 7, in each frame after normal communication is established (step S200), a frequency offset is estimated (step S202).

Successively, whether the frequency offset value has abruptly changed or not is determined (step S204). If abrupt change thereof between adjacent frames has been determined, the processing will proceed to step S206.

On the other hand, in step S204, if the frequency offset value has not abruptly changed, the processing will return to step S200.

In step S206, an occurrence of a UW error is monitored at a user other than those who are to be processed during communication (step S206). If the UW error has not occurred, the processing will return to step S200.

Meanwhile, in step S206, if the UW error occurs and other users seem to have disappeared, SWAP detecting unit SDP will provide notification of swap detection, considering that the conditions for swap detection has been satisfied.

The control unit of SDMA base station 1000 performs processing corresponding to swap when it is detected (step S210).

When using a process flow as described above as well, uncomfortable noise due to swap can be suppressed at a terminal by performing "processing corresponding to swap" as described above when it is detected.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. Radio equipment comprising a receiving unit (RP1-RP4, USP) for receiving a plurality of input signals from a plurality of terminals; wherein
said receiving unit includes
an array antenna having a plurality of antennas (#1-#4),
an adaptive array processing unit (USP1, USP2) receiving said plurality of input signals from said plurality of antennas and extracting from said plurality of input signals a reception signal from a prescribed terminal among said plurality of terminals, said adaptive array processing unit including an offset estimating unit (16) for extracting a frequency offset of said reception signal at a prescribed timing, and
a swap detecting unit (SDP) detecting an occurrence of swap of input signals among said plurality of terminals based on an estimation result of said offset estimating unit.

2. The radio equipment according to claim 1, wherein
said adaptive array processing unit includes a weight vector calculating unit (10) calculating a weight vector to multiply each of said plurality of input signals received from said array antenna respectively,
said reception signal includes a plurality of frames,
each said frame has a reference signal for calculating said weight vector and an error detecting code, and
said swap detecting unit also detects swap, based on a calculation error of the weight vector of said reference signal for a reception signal from one of said plurality of terminals and an error detection result for a reception signal from another terminal among said plurality of terminals.

3. The radio equipment according to claim 1, wherein
said adaptive array processing unit includes a weight vector calculating unit calculating a weight vector to multiply each of said plurality of input signals received from said array antenna respectively,
said reception signal includes a plurality of frames,
each said frame has a reference signal for calculating said weight vector, and
said swap detecting unit also detects swap, based on a calculation error of the weight vector of said reference signal for a reception signal from one of said plurality of terminals and a convergence property of weight vector calculation for a reception signal from another terminal among said plurality of terminals.

4. The radio equipment according to claim 1, wherein
said adaptive array processing unit includes a weight vector calculating unit calculating a weight vector to multiply each of said plurality of input signals received from said array antenna respectively, and
said swap detecting unit also detects swap, based on a temporal change in an incoming direction of a reception signal from one of said plurality of terminals.

5. The radio equipment according to claim 1, wherein
said reception signal includes a plurality of frames,
said radio equipment and said plurality of terminals communicate information on a frame number of said reception signal at a prescribed interval, and
said swap detecting unit detects swap, based on a temporal change in said frame number from one of said plurality of terminals.

6. Radio equipment receiving a reception signal including a plurality of frames, comprising:
a receiving unit (RP1-RP4, USP) for receiving a plurality of input signals from a plurality of terminals,
said receiving unit including
an array antenna having a plurality of antennas (#1-#4), and
an adaptive array processing unit (USP1, USP2) receiving said plurality of input signals from said plurality of antennas and extracting from said plurality of input signals said reception signal from a prescribed terminal among said plurality of terminals, and
said adaptive array processing unit has a weight vector calculating unit (10) calculating a weight vector to multiply each of said plurality of input signals received from said array antenna respectively, based on a reference signal included in each said frame, and
a swap detecting unit detecting an occurrence of swap of signals from said plurality of terminals, based on a calculation error of the weight vector of said reference signal for a reception signal from one of said plurality of terminals and an error detection result for a reception signal from another terminal among said plurality of terminals, based on an error detecting code included in each said frame for error detection.

7. Radio equipment receiving a reception signal including a plurality of frames, comprising:
a receiving unit (RP1-RP4, USP) for receiving a plurality of input signals from a plurality of terminals, said receiving unit including
an array antenna having a plurality of antennas (#1-#4), and
an adaptive array processing unit (USP1, USP2) receiving said plurality of input signals from said plurality of antennas and extracting from said plurality of input signals said reception signal from a prescribed terminal among said plurality of terminals, and
said adaptive array processing unit has a weight vector calculating unit (10) calculating a weight vector to multiply each of said plurality of input signals received from said array antenna respectively, based on a reference signal included in each said frame, and
a swap detecting unit detecting swap, based on a calculation error of the weight vector of said reference signal for a reception signal from one of said plurality of terminals and a convergence property of weight vector calculation for a reception signal from another terminal among said plurality of terminals.

8. Radio equipment receiving a reception signal including a plurality of frames, each said frame having a reference signal for calculating a weight vector, comprising:
a receiving unit (RP1-RP4, USP) for receiving a plurality of input signals from a plurality of terminals,
said receiving unit including
an array antenna having a plurality of antennas (#1-#4), and
an adaptive array processing unit (USP1, USP2) receiving said plurality of input signals from said plurality of antennas and extracting from said plurality of input signals said reception signal from a prescribed terminal among said plurality of terminals, and said adaptive array processing unit has a weight vector calculating unit (10) calculating a weight vector to multiply each of said plurality of input signals received from said array antenna respectively, based on a said reference signal included in each said frame, and a swap detecting unit detecting swap, based on a temporal change in an incoming direction of a reception signal from one plurality of terminals.

9. Radio equipment receiving a reception signal including a plurality of frames, comprising:

a receiving unit (RP1-RP4, USP) for receiving a plurality of input signals from a plurality of terminals and separating from said plurality of input signals said reception signal from a prescribed terminal of said plurality of terminals; and a swap detecting unit detecting swap, in response to a temporal change in a frame number from one of said plurality of terminals, detected based on information on said frame number included in said reception signal at least at a prescribed interval.

10. A method of detecting swap in radio equipment capable of receiving an input signal from each of a plurality of terminals and separately receiving at least one reception signal from each of said input signals, comprising the steps of:

extracting a frequency offset of a reception signal of said at least one reception signal at a prescribed timing; and detecting an occurrence of a swap of said input signals among said plurality of terminals, based on an estimation result of said frequency offset.

11. The method of detecting swap according to claim 10, wherein said radio equipment includes an array antenna having a plurality of antennas, said reception signal includes a plurality of frames, each said frame has a reference signal for calculating a weight vector and an error detecting code;

the method further comprising the step of receiving said input signals from said plurality of antennas, performing adaptive array processing by calculating a weight vector to multiply each said input signal from said array antenna respectively, based on said reference signals, and extracting said reception signal from a prescribed terminal; wherein said step of detecting an occurrence of swap further includes the steps of detecting a calculation error of a weight vector of said reference signals for a reception signal from one of said plurality of terminals, detecting an error for a reception signal from another terminal among said plurality of terminals, and detecting swap based on said calculation error and a result of said error detection.

12. The method of detecting swap according to claim 10, wherein said radio equipment includes an array antenna having a plurality of antennas, said reception signal includes a plurality of frames, each said frame has a reference signal for calculating a weight vector;

the method further comprising the step of receiving said input signals from said plurality of antennas, performing adaptive array processing by calculating a weight vector to multiply each said input signal from said array antenna respectively, based on said reference signals, and extracting said reception signal from a prescribed terminal; wherein said step of detecting an occurrence of swap further includes the steps of detecting a calculation error of a weight vector of said reference signals for a reception signal from one of said plurality of terminals, and detecting swap, based on a convergence property of weight vector calculation for a reception signal from another terminal among said plurality of terminals and said calculation error.

13. The method of detecting swap according to claim 10, wherein said radio equipment includes an array antenna having a plurality of antennas, said reception signal includes a plurality of frames, each said frame has a reference signal for calculating a weight vector;

the method further comprising the step of receiving said input signals from said plurality of antennas, performing adaptive array processing by calculating a weight vector to multiply each said input signal from said array antenna respectively, based on said reference signals, and extracting said reception signal from a prescribed terminal; wherein said step of detecting an occurrence of swap further includes the step of detecting swap, based on a temporal change in an incoming direction of a reception signal from one of said plurality of terminals.

14. The method of detecting swap according to claim 10, wherein said reception signal includes a plurality of frames;

the method further comprising the step of communicating information on a frame number of said reception signal at a prescribed interval, between said radio equipment and said plurality of terminals; wherein said step of detecting an occurrence of swap further includes the step of detecting swap, based on a temporal change in a frame number from one of said plurality of terminals.

15. A method of detecting swap in radio equipment capable of separately receiving, for each terminal, a reception signal transmitted from a plurality of terminals by using an array antenna including a plurality of antennas, said reception signal including a plurality of frames, each said frame having a reference signal for calculating a weight vector and an error detecting code, comprising the steps of:

receiving an input signal from each of said plurality of antennas, performing adaptive array processing by calculating a weight vector to multiply each said input signal from said array antenna, based on said reference signals, and extracting said reception signal from a prescribed terminal;

detecting a calculation error of a weight vector of said reference signals for a reception signal from one of said plurality of terminals;

detecting an error for a reception signal from another terminal among said plurality of terminals; and detecting swap, based on said calculation error and a result of said error detection.

16. A method of detecting swap in radio equipment capable of separately receiving, for each terminal, a reception signal transmitted from a plurality of terminals by using an array antenna including a plurality of antennas, said reception signal including a plurality of frames, each said frame having a reference signal for calculating a weight vector, comprising the steps of:

receiving an input signal from each of said plurality of antennas, performing adaptive array processing by calculating a weight vector to multiply each said input signal from said array antenna, based on said reference signal, and extracting said reception signal from a prescribed terminal;

detecting a calculation error of a weight vector of said reference signals for a reception signal from one of said plurality of terminals; and detecting swap, based on a convergence property of weight vector calculation for a reception signal from another terminal among said plurality of terminals and said calculation error.

17. A method of detecting swap in radio equipment capable of separately receiving, for each terminal, a reception signal transmitted from a plurality of terminals by using an array antenna including a plurality of antennas, said reception signal including a plurality of frames, each said frame having a reference signal for calculating a weight vector, comprising the steps of:

receiving an input signal from each of said plurality of antennas, performing adaptive array processing by calculating a weight vector to multiply said input signal from said array antenna, based on said reference signal, and extracting said reception signal from a prescribed terminal; and detecting swap, based on a temporal change in an incoming direction of a reception signal from one of said plurality of terminals.

18. A method of detecting swap in radio equipment receiving a reception signal including a plurality of frames, comprising the steps of:

receiving a plurality of input signals from a plurality of terminals;

separating from said plurality of input signals said reception signal from a prescribed terminal of said plurality of terminals;

communicating information on a frame number of said reception signal at a prescribed interval, between said radio equipment and said plurality of terminals; and detecting swap, based on a temporal change in a frame number from one of said plurality of terminals.

19. Computer readable media usable with a programmable computer having a computer program code embodied therein for performing swap detection in radio equipment receiving a plurality of input signals from a plurality of terminals and separately receiving at least one reception signal from said plurality of input signals, said computer readable media comprising computer program code, which when executed by the computer causes the computer to execute the steps of:

extracting a frequency offset of a reception signal of said at least one reception signal at a prescribed timing; and detecting an occurrence of swap of said input signals from said plurality of terminals, based on an estimation result of said frequency offset.

20. The computer readable media according to claim 19, wherein said radio equipment includes an array antenna having a plurality of antennas, said reception signal includes a plurality of frames, each said frame has a reference signal for calculating a weight vector and an error detecting code;

the computer readable media further comprising computer program code, which when executed by the computer causes the computer to execute the step of receiving an input signal from each of said plurality of antennas, performing adaptive array processing by calculating a weight vector to multiply each said input signal from said array antenna respectively, based on said reference signals, and extracting said reception signal from a prescribed terminal; wherein said step of detecting an occurrence of swap includes the steps of detecting a calculation error of a weight vector of said reference signals for a reception signal from one of said plurality of terminals, detecting an error for a reception signal from another terminal among said plurality of terminals, and detecting swap, based on said calculation error and a result of said error detection.

21. The computer readable media according to claim 19, wherein said radio equipment includes an array antenna having a plurality of antennas, said reception signal includes a plurality of frames, each said frame has a reference signal for calculating a weight vector;

the computer readable media further comprising computer program code, which when executed by the computer causes the computer to execute the step of receiving an input signal from each of said plurality of antennas, performing adaptive array processing by calculating a weight vector to multiply each said input signal from said array antenna respectively, based on said reference signals, and extracting said reception signal from a prescribed terminal; wherein said step of detecting an occurrence of swap includes the steps of detecting a calculation error of a weight vector of said reference signals for a reception signal from one of said plurality of terminals, and detecting swap, based on a convergence property of weight vector calculation for a reception signal from another terminal among said plurality of terminals and said calculation error.

22. The computer readable media according to claim 19, wherein said radio equipment includes an array antenna having a plurality of antennas, said reception signal includes a plurality of frames, each said frame has a reference signal for calculating a weight vector;

the computer readable media further comprising computer program code, which when executed by the computer causes the computer to execute the step of receiving an input signal from each of said plurality of antennas, performing adaptive array processing by calculating a weight vector to multiply each said input signal from said array antenna respectively, based on said reference signals, and extracting said reception signal from a prescribed terminal; wherein said step of detecting an occurrence of swap includes the step of detecting swap, based on a temporal change in an incoming direction of a reception signal from one of said plurality of terminals.

23. The computer readable media according to claim 19, wherein said reception signal includes a plurality of frames;

the computer readable media further comprising computer program code, which when executed by the computer causes the computer to execute the step of communicating information on a frame number of said reception signal at a prescribed interval, between said radio equipment and said plurality of terminals; wherein said step of detecting an occurrence of swap includes the step of detecting swap, based on a temporal change in said frame number from one of said plurality of terminals.

24. Computer readable media usable with a programmable computer having a computer readable program code embodied therein for performing swap detection in radio equipment capable of separately receiving, for each terminal, a reception signal transmitted from a plurality of terminals by using an array antenna including a plurality of antennas, said reception signal including a plurality of frames, each said frame having a reference signal for calculating a weight vector and an error detecting code, said computer readable media comprising computer program code, which when executed by the computer causes the computer to execute the steps of:

receiving an input signal from each of said plurality of antennas, performing adaptive array processing by calculating a weight vector to multiply each said input signal from said array antenna respectively, based on said reference signals, and extracting said reception signal from a prescribed terminal;

detecting a calculation error of a weight vector of said reference signals for a reception signal from one of said plurality of terminals;

detecting an error for a reception signal from another terminal among said plurality of terminals; and detecting swap, based on said calculation error and a result of said error detection.

25. Computer readable media usable with a programmable computer having a computer readable program code embodied therein for performing swap detection in radio equipment capable of separately receiving, for each terminal, a reception signal transmitted from a plurality of terminals by using an array antenna including a plurality of antennas, said reception signal including a plurality of frames, each said frame having a reference signal for calculating a weight vector, said computer readable media comprising computer program code, which when executed by the computer causes the computer to execute the steps of:

receiving an input signal from each of said plurality of antennas, performing adaptive array processing by calculating a weight vector to multiply each said input signal from said array antenna respectively, based on said reference signals, and extracting said reception signal from a prescribed terminal;

detecting a calculation error of a weight vector of said reference signals for a reception signal from one of said plurality of terminals; and detecting swap, based on a convergence property of weight vector calculation for a reception signal from another terminal among said plurality of terminals and said calculation error.

26. Computer readable media usable with a programmable computer having a computer readable program code embodied therein for performing swap detection in radio equipment capable of separately receiving, for each terminal, a reception signal transmitted from a plurality of terminals by using an array antenna including a plurality of antennas, said reception signal including a plurality of frames, each said frame having a reference signal for calculating a weight vector, said computer readable program code comprising computer program code, which when executed by the computer causes the computer to execute the steps of:

receiving an input signal from each of said plurality of antennas, performing adaptive array processing by calculating a weight vector to multiply each said input signal from said array antenna respectively, based on said reference signal, and extracting said reception signal from a prescribed terminal; and detecting swap, based on a temporal change in an incoming direction of a reception signal from one of said plurality of terminals.

27. Computer readable media usable with a programmable computer having a computer readable program code embodied therein for swap detection in radio equipment receiving a reception signal including a plurality of frames, said computer readable program code comprising computer program code, which when executed by the computer causes the computer to execute the steps of:

separating said reception signal from a plurality of terminals;

communicating information on a frame number of said reception signal at a prescribed interval, between said radio equipment and said plurality of terminals; and detecting swap, based on a temporal change in a frame number from one of said plurality of terminals.

* * * * *